US009584879B2

(12) United States Patent
Takeuchi et al.

(10) Patent No.: US 9,584,879 B2
(45) Date of Patent: Feb. 28, 2017

(54) PATCH PANEL CABLE RETENTION MECHANISMS

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 177 days.

(21) Appl. No.: 14/289,871

(22) Filed: May 29, 2014

(65) Prior Publication Data

US 2014/0354131 A1    Dec. 4, 2014

Related U.S. Application Data

(60) Provisional application No. 61/828,358, filed on May 29, 2013, provisional application No. 61/859,987, filed on Jul. 30, 2013.

(51) Int. Cl.
*G02B 6/44* (2006.01)
*H04Q 1/06* (2006.01)
(Continued)

(52) U.S. Cl.
CPC .............. *H04Q 1/066* (2013.01); *A47B 81/00* (2013.01); *A47B 88/0466* (2013.01);
(Continued)

(58) Field of Classification Search
None
See application file for complete search history.

(56) References Cited

U.S. PATENT DOCUMENTS 2,865,979 A    12/1958  Klassen
4,353,518 A *  10/1982  Taylor .................. H05K 7/1491
                                                              248/281.11
(Continued)

FOREIGN PATENT DOCUMENTS

EP    0207926 A2    1/1987
EP    0795935 A2    9/1997

OTHER PUBLICATIONS

International Search Report and Written Opinion for Application No. PCT/US2013/033701 dated Sep. 2, 2013.
(Continued)

*Primary Examiner* — Mike Stahl
(74) *Attorney, Agent, or Firm* — Lerner, David, Littenberg, Krumholz & Mentlik, LLP

(57) ABSTRACT

A device and a system may facilitate access to communication connectors, adapters, and/or ports that are supported within a housing, e.g., a rack or cabinet. The system may include one or more of the devices. The system may also include a device that manages, e.g., guides and supports cables that are operatively coupled to the connectors, adapters, and/or ports. The ports may be on a tray that is engaged with the housing. A retainer arm may have first end, and a second end pivotably coupled to the tray. A cable retainer may be coupled to the retainer arm. An actuation mechanism may operably couple the tray to the retainer arm. The actuation mechanism may be configured to move the cable retainer from a first position over the tray to a second position extending beyond a side of the tray as the tray is pulled out of the housing.

13 Claims, 23 Drawing Sheets

(51) Int. Cl.
*A47B 81/00* (2006.01)
*A47B 96/02* (2006.01)
*A47B 88/04* (2006.01)
*H04Q 1/02* (2006.01)

(52) U.S. Cl.
CPC .............. *A47B 96/02* (2013.01); *G02B 6/444* (2013.01); *H04Q 1/06* (2013.01); *H04Q 1/13* (2013.01); *A47B 2200/0084* (2013.01)

(56) References Cited

U.S. PATENT DOCUMENTS

| | | | |
|---|---|---|---|
| 4,688,885 | A | 8/1987 | Poteat et al. |
| 5,100,221 | A | 3/1992 | Carney et al. |
| 5,613,021 | A | 3/1997 | Saito et al. |
| 5,775,755 | A | 7/1998 | Covert et al. |
| 6,070,742 | A * | 6/2000 | McAnally ............ H05K 7/1491 211/26 |
| 6,263,141 | B1 | 7/2001 | Smith |
| 6,293,707 | B1 | 9/2001 | Wild |
| 6,327,139 | B1 | 12/2001 | Champion et al. |
| 6,356,697 | B1 | 3/2002 | Braga et al. |
| 6,442,030 | B1 | 8/2002 | Mammoser et al. |
| 6,556,763 | B1 | 4/2003 | Puetz et al. |
| 6,902,069 | B2 | 6/2005 | Hartman et al. |
| 6,925,241 | B2 | 8/2005 | Bohle et al. |
| 7,335,056 | B1 | 2/2008 | Clark et al. |
| 7,352,945 | B2 | 4/2008 | Holmberg et al. |
| 7,460,758 | B2 | 12/2008 | Xin |
| 7,746,667 | B1 | 6/2010 | Baiza et al. |
| 8,068,715 | B2 | 11/2011 | Kewitsch |
| 8,175,425 | B2 | 5/2012 | Chen |
| 8,179,684 | B2 | 5/2012 | Smrha et al. |
| 8,731,361 | B2 | 5/2014 | Anderson et al. |
| 8,939,792 | B2 | 1/2015 | Takeuchi et al. |
| 2002/0117942 | A1 | 8/2002 | Audibert et al. |
| 2004/0074852 | A1 | 4/2004 | Knudsen et al. |
| 2004/0178312 | A1 | 9/2004 | Parsons |
| 2005/0111809 | A1 | 5/2005 | Giraud et al. |
| 2006/0018622 | A1 | 1/2006 | Caveney et al. |
| 2006/0162948 | A1 | 7/2006 | Rinderer et al. |
| 2007/0096606 | A1 | 5/2007 | Ryu |
| 2007/0189692 | A1 | 8/2007 | Zimmel et al. |
| 2007/0230889 | A1 * | 10/2007 | Sato ..................... G02B 6/4261 385/135 |
| 2008/0002937 | A1 | 1/2008 | Spisany et al. |
| 2008/0205843 | A1 | 8/2008 | Castonguay et al. |
| 2009/0078834 | A1 | 3/2009 | Chen et al. |
| 2009/0086441 | A1 | 4/2009 | Randall et al. |
| 2009/0238533 | A1 * | 9/2009 | Stansbury ............ G02B 6/4452 385/135 |
| 2010/0008623 | A2 | 1/2010 | Arol et al. |
| 2010/0054659 | A1 | 3/2010 | Pnini et al. |
| 2010/0310221 | A1 | 12/2010 | Le Dissez |
| 2010/0310225 | A1 | 12/2010 | Anderson et al. |
| 2011/0267794 | A1 | 11/2011 | Anderson et al. |
| 2011/0317971 | A1 * | 12/2011 | Zhang .................... H04Q 1/023 385/135 |
| 2012/0019117 | A1 | 1/2012 | Dunwoody et al. |
| 2012/0321255 | A1 | 12/2012 | Kewitsch |
| 2013/0196538 | A1 | 8/2013 | Takeuchi et al. |
| 2014/0248028 | A1 * | 9/2014 | Campbell ............ G02B 6/4452 385/135 |
| 2014/0262487 | A1 * | 9/2014 | Takeuchi ............ H02G 3/0456 174/535 |
| 2014/0348481 | A1 | 11/2014 | Giraud et al. |
| 2014/0354131 | A1 | 12/2014 | Takeuchi et al. |
| 2014/0355217 | A1 | 12/2014 | Takeuchi et al. |
| 2014/0357118 | A1 | 12/2014 | Takeuchi et al. |
| 2015/0253529 | A1 | 9/2015 | Lu et al. |
| 2015/0268436 | A1 | 9/2015 | Blackwell, Jr. et al. |
| 2015/0301298 | A1 * | 10/2015 | Frith .................... G02B 6/4441 385/135 |
| 2016/0047999 | A1 | 2/2016 | Alexi et al. |

OTHER PUBLICATIONS

International Search Report and Written Opinion for Application No. PCT/US2014/021953 dated Jun. 25, 2014.
International Search Report for Application No. PCT/US2013/023176 dated Jun. 27, 2013.
Partial International Search Report for Application No. PCT/US2013/023176 dated May 2, 2013.
Partial International Search Report for Application No. PCT/US2013/033701 dated Jul. 11, 2013.

* cited by examiner

FIG. 10G"

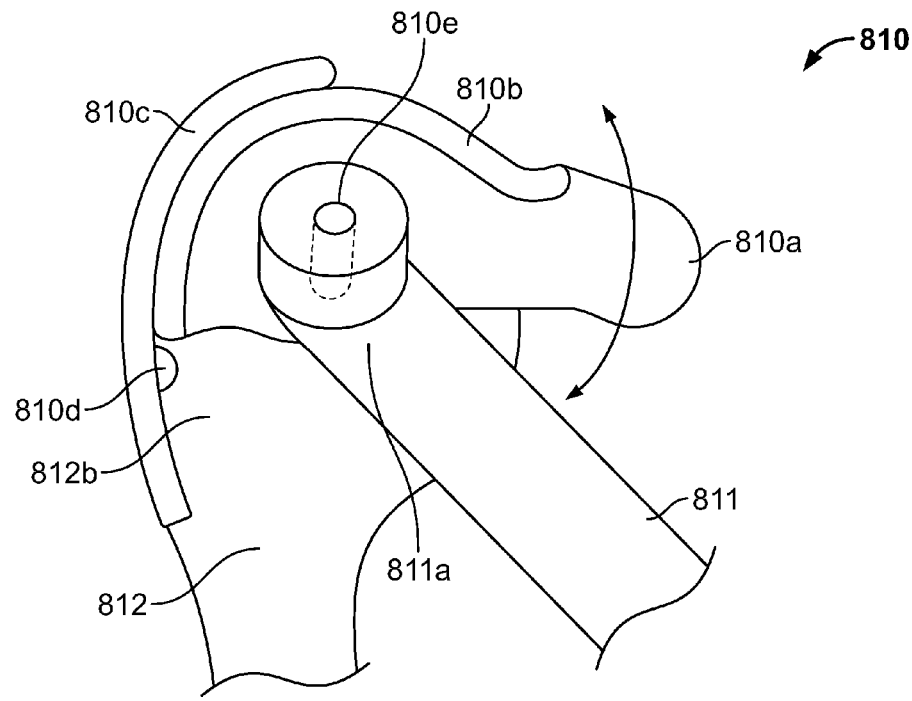
FIG. 10J
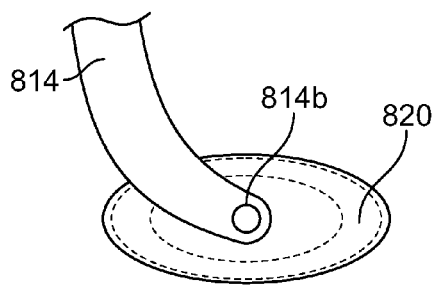 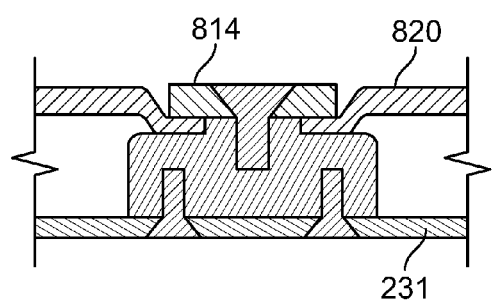
FIG. 10K　　　　FIG. 10L

PATCH PANEL CABLE RETENTION MECHANISMS

CROSS-REFERENCE TO RELATED APPLICATIONS

The present application claims the benefit of the filing dates of U.S. Provisional Patent Application No. 61/828,358 filed May 29, 2013, and U.S. Provisional Patent Application No. 61/859,987 filed Jul. 30, 2013, the disclosures of which are both hereby incorporated by reference herein.

BACKGROUND OF THE DISCLOSURE

The present disclosure generally relates to a device and a system for supporting and managing communication connectors, adapters, and/or ports. More particularly, the present disclosure relates to communication patch panel devices and systems, which facilitate access to communication connectors, adapters, and/or ports supported by the devices and systems.

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate access communication adapters and/or cables supported by communication patching devices and systems.

BRIEF SUMMARY

The present disclosure is generally related to communication patch panels and communication patching systems. In particular, the present disclosure is related to patch panels that facilitate both the placement of multiple, relatively small connectors in close proximity to each other and the manipulation and/or maintenance of those connectors.

According to one embodiment of the disclosure, a communication patch panel system includes a tray having a plurality of ports connectable to cables, the tray being engaged with a housing and having a first position substantially inside the housing and a second position substantially outside the housing. A retainer arm may have a first end and a second end, the second end being pivotably coupled to the tray. A cable retainer may be coupled to the first end of the retainer arm. An actuation mechanism may operably couple the tray to the retainer arm. The actuation mechanism may be configured to move the cable retainer from a first position over the tray to a second position extending beyond a side of the tray when the tray is transitioned from the first position to the second position.

According to another embodiment of the disclosure, a communication patch panel system may include a tray having a plurality of ports connectable to cables, the tray engaged with a housing and having a first position substantially inside the housing and a second position substantially outside the housing. A rail may be fixed to the tray and may define a path between a first end and a second end. A slide may have a first end and a second end, and may be engaged to the rail. The slide may be moveable along the rail between the first and second ends of the rail. An actuation mechanism may be operably coupled to the slide and pivotably coupled to the housing. A cable retainer may be coupled to the slide and may be moveable to transition from a first position over the tray to a second position extending beyond a side of the tray. Upon movement of the tray to transition from the first position to the second position, the arm may be configured to rotate, causing the cable retainer to transition from the first position to the second position.

According to a further embodiment of the disclosure, a communication patch panel system may include a tray having a plurality of ports connectable to cables, the tray engaged with a housing and having a first position substantially inside the housing and a second position substantially outside the housing. A first arm may have a first end and a second end, the first end pivotably coupled to the housing. A second arm may have a first end and a second end, the second end pivotably coupled to the second end of the first arm. A first cable retainer may be coupled to the first end of the second arm, the first cable retainer being moveable from a first position over the tray to a second position extending beyond a side of the tray.

According to still a further embodiment of the disclosure, a communication patch panel system may include a housing including a front end, a back end, and a side extending from the front end to the back end. The system may also include a tray and a patch panel device. The patch panel device may include a first cable retainer fixedly attached at the side of the tray, the tray being movable with the first cable retainer along a first axis extending from the front end to the back end of the housing such that the first cable retainer, when adjacent to the side of the housing, is a predetermined distance from the side of the housing. The patch panel device may also include a second cable retainer attached to the side of the housing and movable to transition from a first position to a second position along a second axis orthogonal to the first axis, the second cable retainer being closer to the side of the housing in the first position than the second position. When the second cable retainer is in the second position, the first cable retainer may be capable of passing between the second cable retainer and the side of the housing when the tray and the first cable retainer are moved in the direction of the first axis.

These and other features of the present disclosure will be more fully described with reference to the accompanying figures.

BRIEF DESCRIPTION OF THE DRAWINGS

By way of description only, embodiments of the present disclosure will be described herein with reference to the accompanying drawings, in which:

FIG. 10G' is an enlarged view of the encircled section of FIG. 10G illustrating an embodiment of a connection means;

FIG. 10G" is an enlarged view of the encircled section of FIG. 10G illustrating another embodiment of a connection means;

FIG. 10J is a top view of a first cable retainer of the multi-arm cable management system of FIG. 10A;

FIG. 10K is a top view of a second cable retainer of the multi-arm cable management system of FIG. 10A; and FIG. 10L is a cross-sectional view of the second cable retainer of FIG. 10K attached to a patch panel device.

DETAILED DESCRIPTION

Figures 1A, 1B:
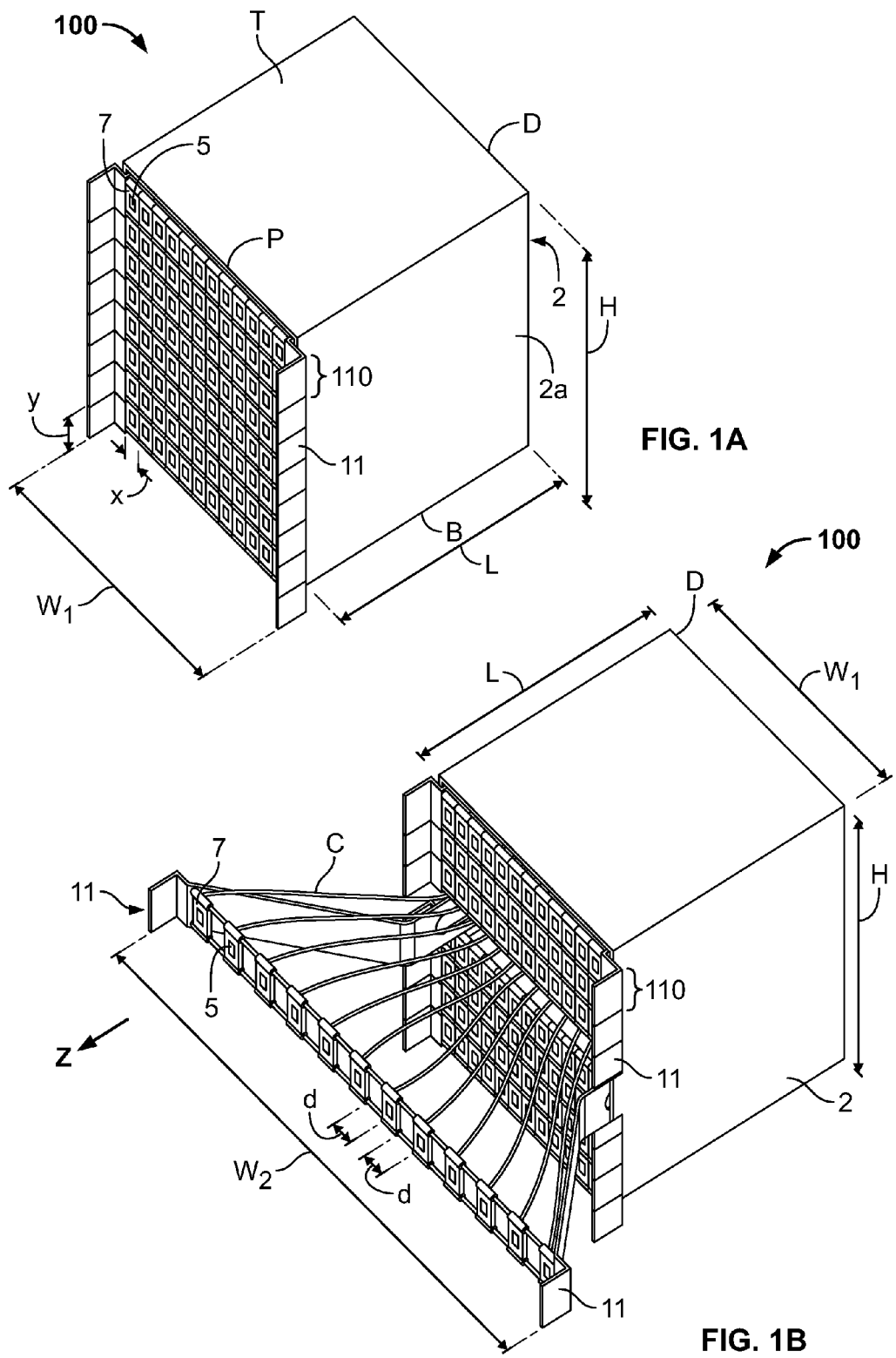
FIG. 1A is a front perspective view of a communication patching system including multiple patch panel devices shown in a first state.
FIG. 1B is the communication patching system of FIG. 1A shown in a second state.

Particular embodiments of the present disclosure are described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Figure 1C:
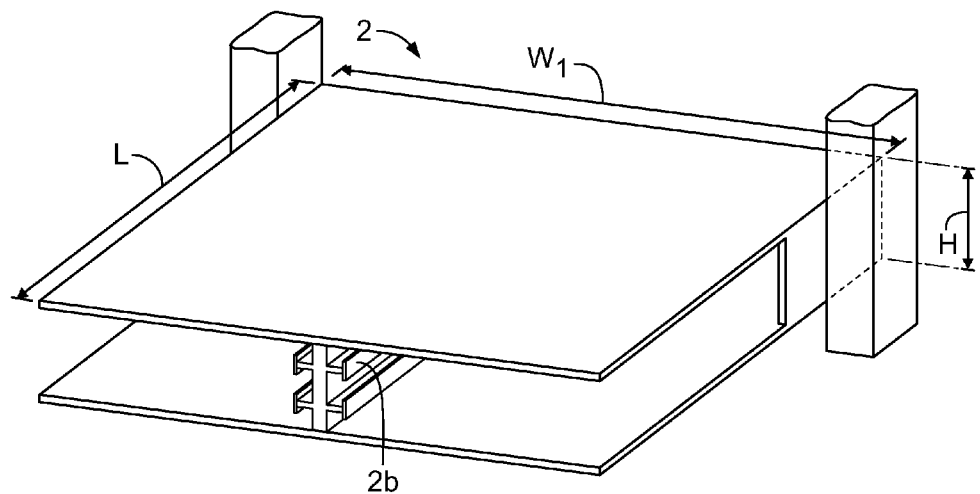
FIG. 1C is a front perspective view of a housing and rack pole, without a patch panel device placed therein.

Now referring to FIGS. 1A-C, a communication patching system 100 may include a housing 2, e.g., a rack or a cabinet. The housing 2 may define a length L, a height H, and a width $W_1$. The housing 2 may support one or more patch panel devices 110, with each device 110 held in vertical alignment with a guide rail 2b (FIG. 1C), a plurality of which may also be disposed in vertical alignment along at least one side of the housing 2. A rack pole 4 may be positioned adjacent to the housing 2, typically at a distal corner. The pole 4 may be configured to receive therein a plurality of cables C extending vertically therethrough. A plurality of spools 4a (illustrated in FIGS. 5A-8C) may be disposed vertically along the pole 4, such that one spool 4a is positioned adjacent to each patch panel device 110 that may be stored in the housing 2. In one embodiment, the cables C may extend vertically through the pole 4 to a first spool 4a, and then to a first patch panel device 110 in the housing 2 corresponding to the first spool 4a.

Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be moved proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
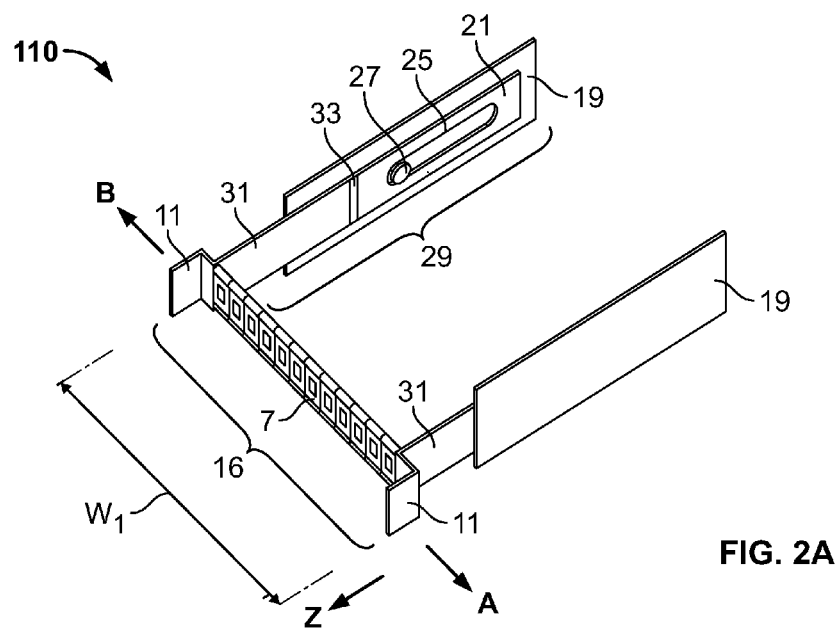
FIG. 2A is one of the patch panel devices of FIG. 1A shown in a first state.
Figure 2B:
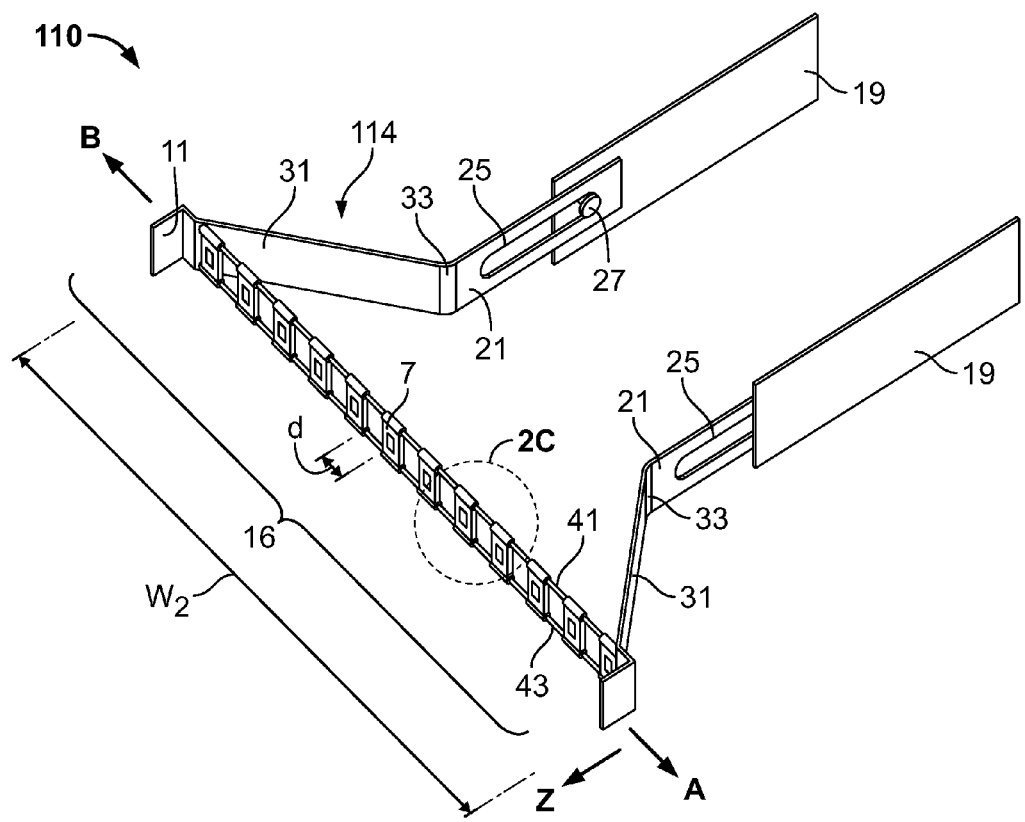
FIG. 2B is the patch panel device of FIG. 2A shown in a second state.
Figure 2C:
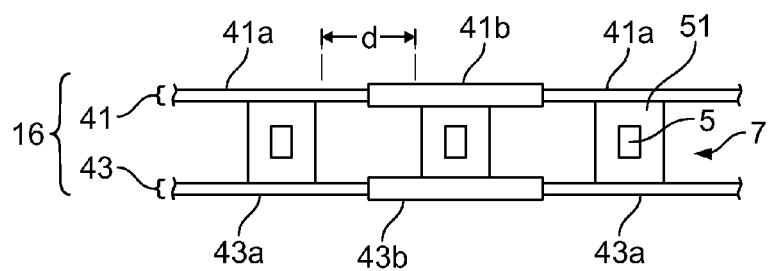
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device within the housing 2 by securing one of the bars 19 on each of opposite sides 2a of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section 31 of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width $W_1$ (FIG. 2A) to a second, expanded width $W_2$ (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by the user or technician.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41a, 41b and 43a, 43b respectively. Sections 41a, 43a may be configured and adapted to slide within sections 41b, 43b respectively, where the ports 7 may be coupled to the sections 41b, 43b, to effect lengthening or shortening of the connections means 16. A resilient or biasing member (not shown) may be placed within a hollowed out center of each of the rails 41, 43 to bias the connections means 16 to one of the first or second dimensions $W_1$, $W_2$, respectively.

The sections 41b, 43b may define an open circumference such that the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement of the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands. A variety of other configurations may be used to effect lateral, angular, or other spacing between ports in a patch panel device to increase access to the ports, such as those described in greater detail in U.S. Provisional Patent Applications No. 61/828,358 and 61/859,987.

For example, another embodiment of a patch panel device is described with reference to FIGS. 3A-3D. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 246. Each of the movable members 246 may be operatively coupled to one or more cables C1, which are shown only in part. The movable member 246 may include a cable adapter or connector 249, which may include a front surface 249a that may be operatively coupled to one cable C1 and a back surface 249b that may be operatively coupled to another cable C1. The movable member 246 may include a receptacle 247 in which the connector 249 may be releasably secured such that the connector 249 may be separated from the attachment member 232.

The movable members 246 may be positioned spaced a distance from an edge 231a of the tray 231 to permit the movable members 246 to rotate relative to the tray 231. In one embodiment, the tray 231 may include a cut-out (not shown) at the movable members 246 to facilitate a range of movement of the movable members 246 relative to the tray 231. The tray 231 may have an axis z extending along its length, an axis y extending along its height, and an axis x extending its width. The securement member 244 may be coaxially aligned with the axis z extending along the length of the tray 231. A plurality of securement members 244 may be positioned in a row extending along axis x along the width of the tray 231.

Figure 3A:
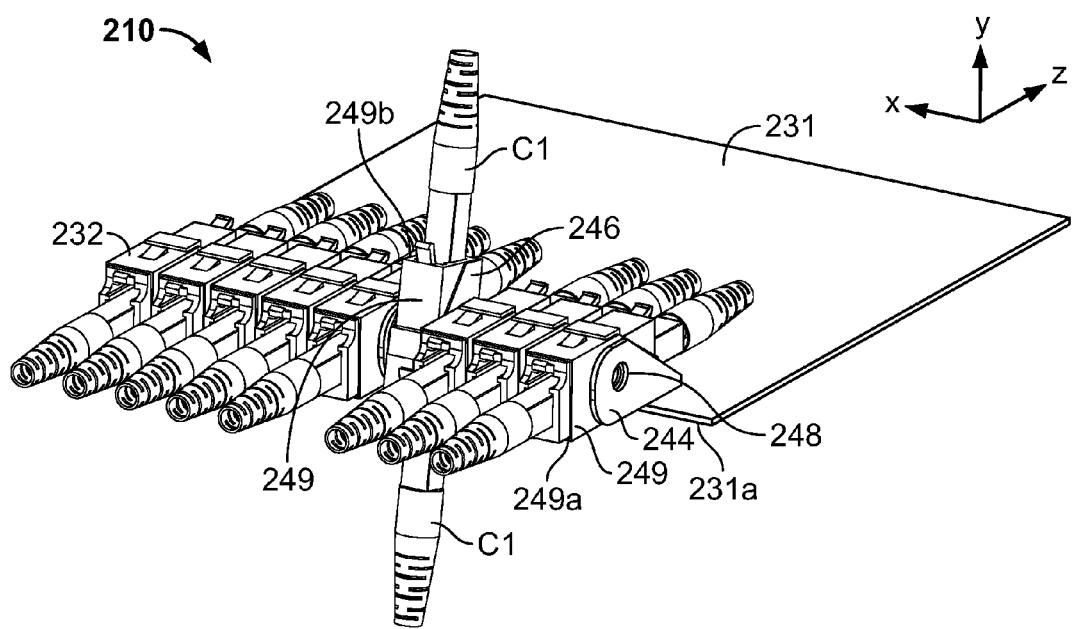
FIG. 3A is a perspective view of another embodiment of a patch panel device including a plurality of attachment members.
Figure 3B:
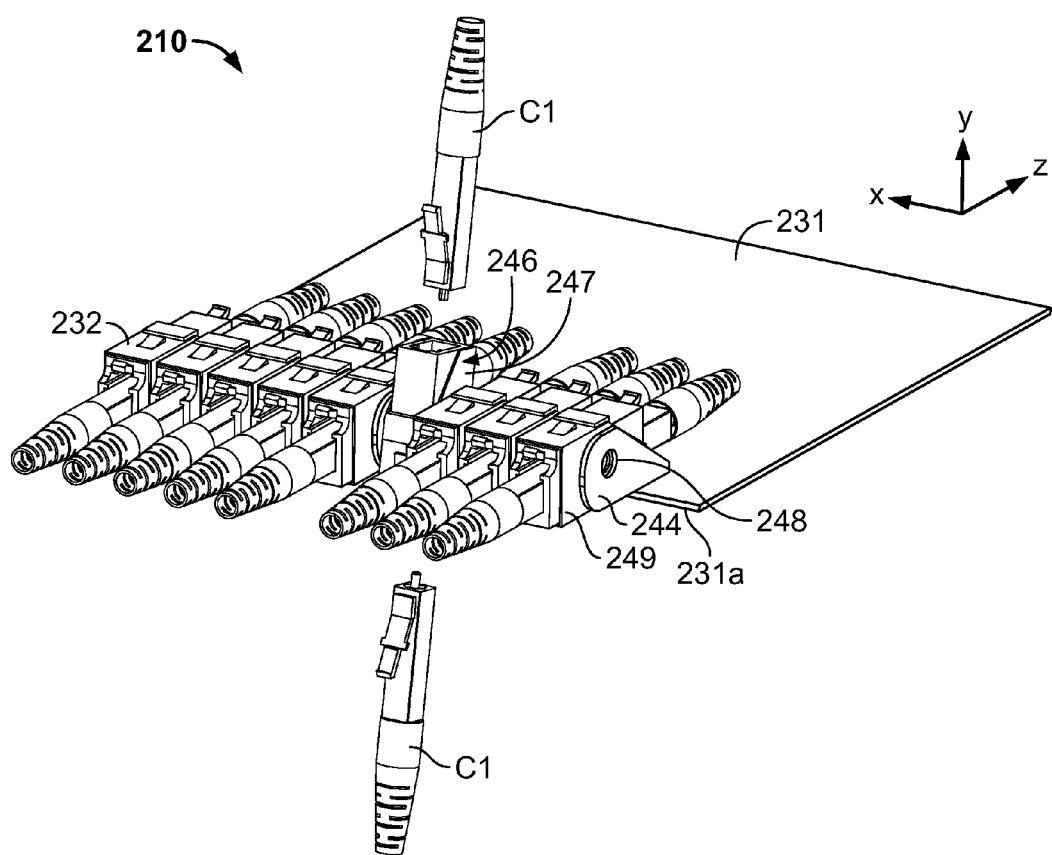
FIG. 3B is a perspective view of the patch panel device of FIG. 3A in which cables have been separated from one of the attachment members.
Figure 3C:
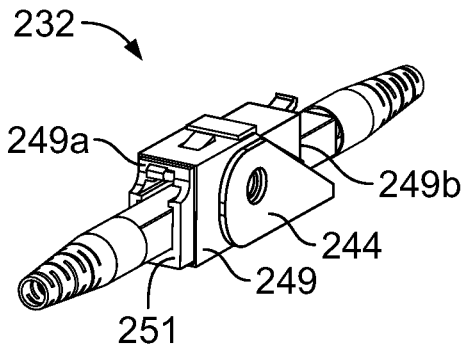
FIG. 3C is a perspective view of one of the attachment members of FIG. 3A shown in a first condition.
Figure 3D:
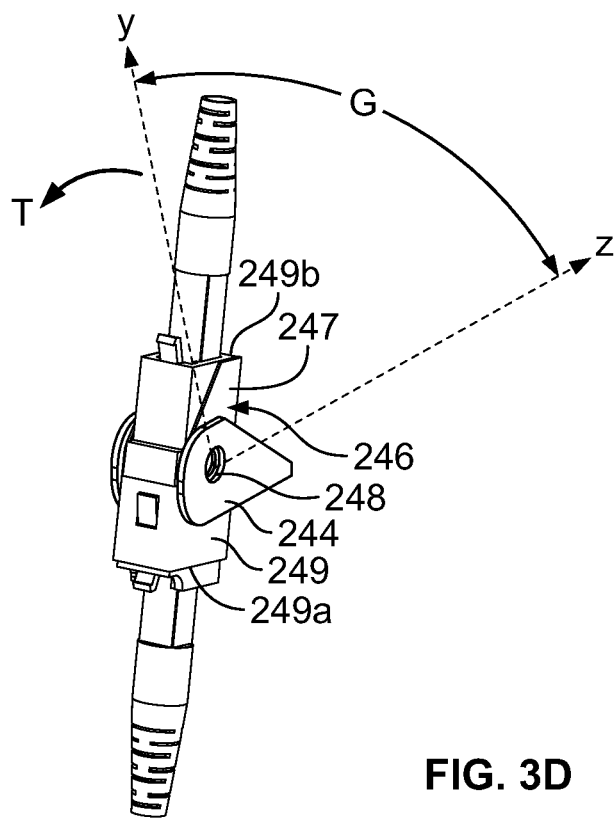
FIG. 3D is a perspective view of one of the attachment members of FIG. 3A shown in a second condition.

As shown in FIGS. 3C-3D, the securement member 244 and a movable member 246 of the attachment member 232 may be pivotably connected to one another at a pivot point 248 such that the movable member 246 may be radially moved relative to the securement member 244 to define an angle G therebetween. In particular, the movable member 246 may radially pivot between the y and z axes and the angle G may be defined therebetween. When secured to the tray 231, the movable member 246 may pivot in a counter-clockwise direction T, but may be inhibited from pivoting in the opposite, clockwise direction by the tray 231. However, as discussed above, cut-outs in the tray 231 may reduce the interaction between the tray 231 and the movable member 246 to facilitate a greater range of movement of the movable member 246 with respect to the tray 231. In an embodiment, the angle G may be adjusted within a range between about 0 and about 135 degrees. In another embodiment, the angle G may be adjusted within a range between about 0 and about 90 degrees. For example, in one embodiment, the movable members 246 may be movable relative to one another to transition the patch panel device 210 between a first condition in which front surfaces 251 of the movable members 246 are substantially coplanar, and adjacent ones of the members 246 are spaced apart a first distance or contact each other, and a second condition in which the front surfaces 251 of respective adjacent members 246 are in different planes in accordance with the angle G that one of the adjacent members 246 is pivoted or rotated relative to the other adjacent members 246, where the other member 246 may or may not be at the same position as in the first condition.

A plurality of patch panel devices 210 may also be supported within housing 2 (see FIGS. 1A-C), and may be translatable into or out from the housing 2 in a direction along axis z. Once spaced apart from the housing 2, the movable member 246 may be pivoted with respect to the securement member 244, thereby spacing the surfaces 249a, 249b of the connector 249 from any adjacent connector 249 such that the cables C1 may be more accessible and readily grasped by a user to detach the cable C1 from the cable adapter or connector 249 of the movable member 246 (as shown in FIG. 3B).

As noted above in connection with FIGS. 1A-C, a number of cables C may be coupled to ports 7 of a particular patch panel device, with the cables C extending vertically through rack pole 4. A number of systems for managing cables C of patch panel systems are described below.

Figure 4A:
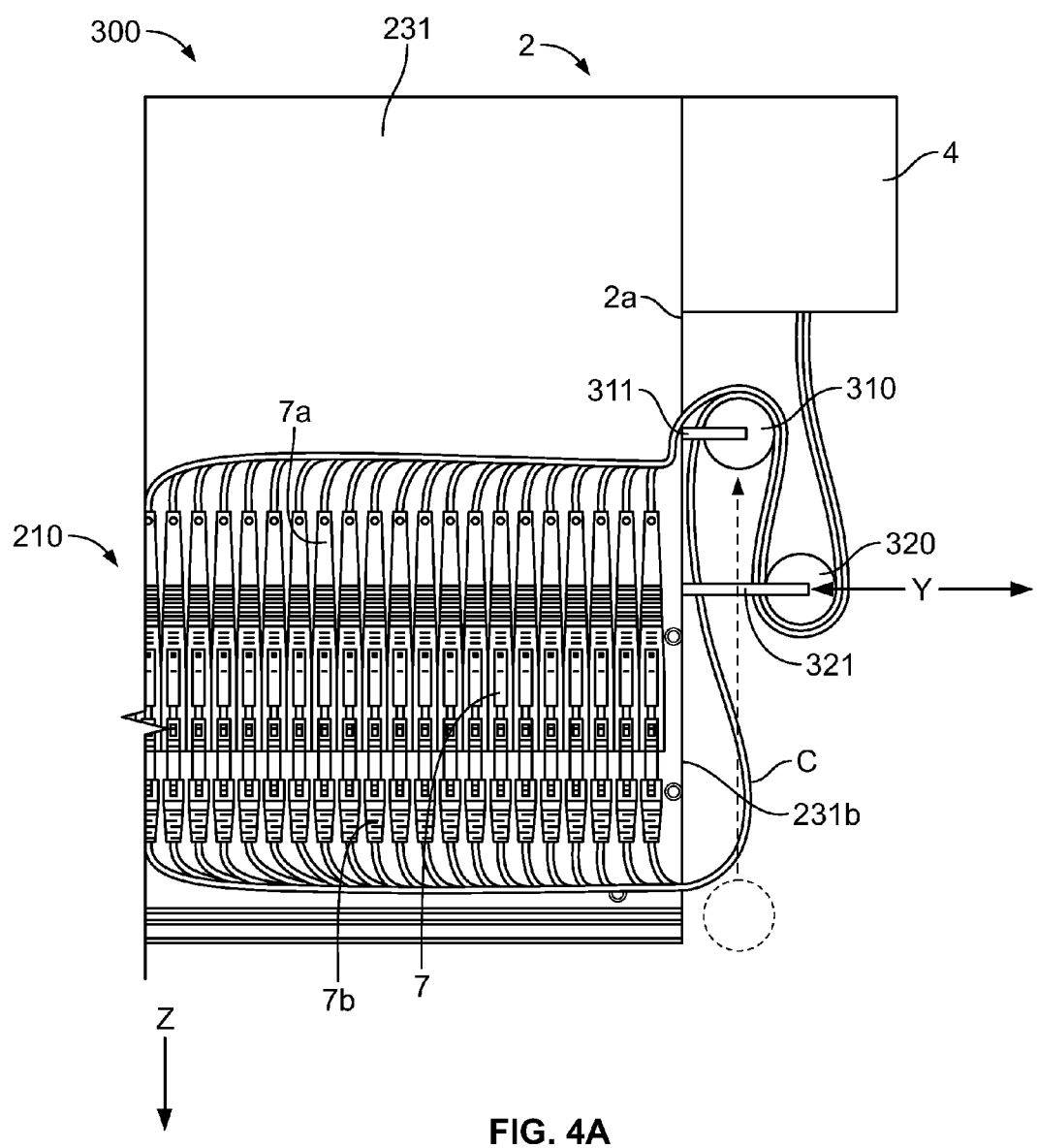
FIG. 4A is a top view of a communication patching system and cable management system shown in a first state.
Figure 4B:
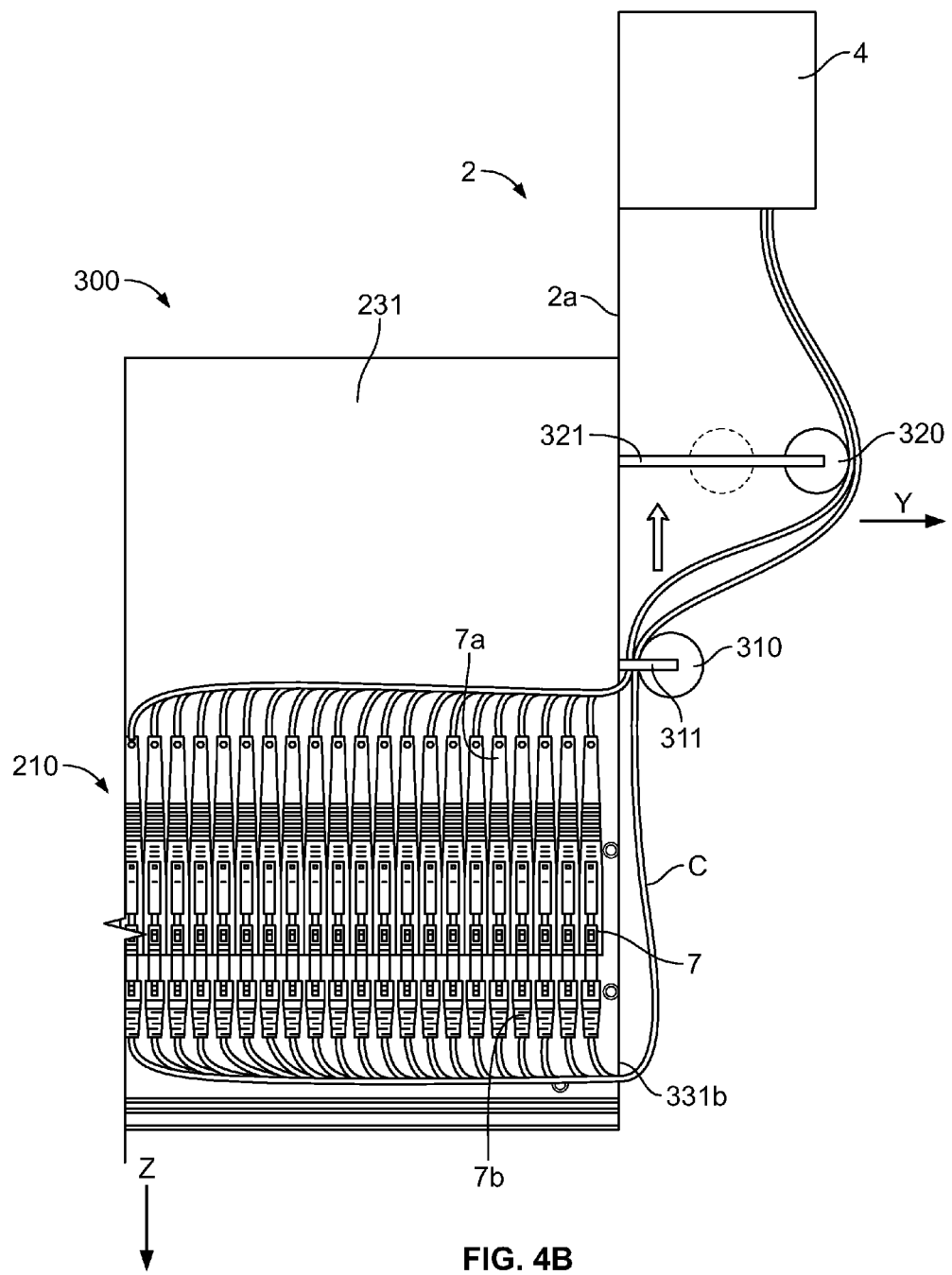
FIG. 4B is a top view of the communication patching system and cable management system of FIG. 4A shown in a second state.

One embodiment of a cable management system 300 is shown in FIGS. 4A-B. Cable management system 300, as well as other embodiments of cable managements systems described herein, may be used with any suitable patch panel device, including suitable devices described herein and suitable devices described in U.S. Provisional Patent Applications No. 61/828,358 and 61/859,987. Cable management system 300 is illustrated in FIGS. 4A-B as being used with a patch panel device similar or identical to patch panel device 210. The cable management system 300 may include a first cable retainer 310 fixedly mounted to an exterior side 231b of tray 231 by a mounting element 311 so as to be spaced a fixed distance from the housing 2. In addition, the system 300 may include a second cable retainer 320 fixedly mounted to an exterior side 2a of the housing 2 by a mounting element 321. The first retainer 630 may be mounted at the side 231b to move with the tray 231, when the tray is moved into and out of the housing 2. The mounting element 321 of the second retainer 320 may be adapted such that the retainer 320 can be moved in a direction Y away from the side 231b to a predetermined position that provides sufficient space for the first retainer 310 with cables extending along its outer surface, to pass between the side 2a and the retainer 320 with cables C extending along its side. The first and second retainers 310, 320 may be shaped such that any portion of a cable C tensioned against or extending along the retainers 310, 320 has at least a minimum radius of curvature, at any position at which the retainers 310, 320 may be disposed relative to the housing 2, thereby avoiding damage to the cable C and/or maintaining a desired level of optical energy transmittance through the cable C. The retainers 310, 320 may have an outer surface that is substantially smooth, and/or may be rotatably mounted to their respective mounting elements, to avoid friction between the cable C and the retainers 310, 320 when the cable C moves along or over the retainer outer surfaces.

As shown in FIGS. 4A-B, cables C may extend vertically within rack pole 4 to an individual patch panel device 210 disposed vertically within housing 2. Cables C may be operatively coupled to distal ends 7a and proximal ends 7b of the ports 7. The housing 2 may include cable guides and supports. The cables C may be supported and guided by the first retainer 310 and the second retainer 320, which may provide support and guidance to the cables C.

In an exemplary operation where cables C are initially not connected to the tray 231 (uninstalled state), the second retainer 320 may be positioned, such as by manually being moved by a user in the direction Y, to be spaced from the exterior side 2a, preferably at a maximum distance from the side 2a that the retainer 320 can be disposed. The cables C from the rack pole 4 may then be attached to the distal and proximal ends 7a and 7b of the ports 7, as shown in FIG. 4B. The tray 231 may then be pushed into the housing 2 (opposite to the direction Z), such that the first retainer 310 passes between the second retainer 320 and the side 2a as the tray 231 moves into the housing 2. With the cables C installed at the distal and proximal ends 7a, 7b and extending along the first and second retainers 310, 320, movement of the first retainer 310 into the housing may cause the second retainer 320 to move towards the exterior side 2A, depending on the extent, or lack thereof, of slack in the cables C between rack pole 4 and the ports 7. After the tray 231 is positioned in the housing 2, the second retainer 320 may be moved manually toward the side 2a to obtain a position as shown in FIG. 4A, if not already in that position based on the cables C causing the second retainer 320 to be moved towards the side 2a after the first retainer 310 passes between the second retainer 320 and the side 2a. The positions of the retainers 310, 320 as shown in FIG. 4A may be predetermined to avoid bending of the cables C extending along the first and second retainers 310, 320 to an extent less than a minimum bending radius, while minimizing the amount of space occupied by the first and second retainers 310, 320 in the direction Y at the distal side, in other words, in front, of the pole rack 4. In such a position of the tray 231, the installed cables C may be positioned for storage adjacent to the tray 231 and the second retainer 320 may be positioned close to the side 2a.

With the cables C installed at the ports 7, when access to the cables C or ports 7 is desired, the tray 231 with the patch panel device 210 may be pulled out of housing 2 in the direction Z. The movement of the tray 231 in the direction Z, in turn, may cause the first retainer 310 attached thereto also to move with tray 231 in direction Z. Accordingly, the first retainer 310 may push the second retainer 320 laterally away from the tray 231 and housing 2 in the direction Y, when the second retainer 320 with the cables C extending along the retainer 320 is in the movement path of the first retainer 310 with the cables C extending along the first retainer 310, to obtain a position such as shown in FIG. 4B. Advantageously, the placement of the first and second retainers 310, 320 exterior to the side 2a of the housing may provide that each patch panel device 210 may have a decreased depth in the distal area behind the ports 7, while also providing for compact storage of the cables C adjacent the housing and leaving space unoccupied in front of the rack pole 4 when the patch panel device 210 is positioned within the housing.

Another embodiment of a cable management system is described with reference to FIGS. 5A-C. As the patch panel devices 210 are translated away from the face P of housing 2, at least a portion of the cables C extending from the pole 4 may correspondingly move. It may be desirable that the movement of the cables C is controlled and managed such that the cables C, when bent, have at least a minimum bending radius, and that the cables C are inhibited from interfering with the translation of the patch panel device 210 with respect to housing 2.

Figure 5A:
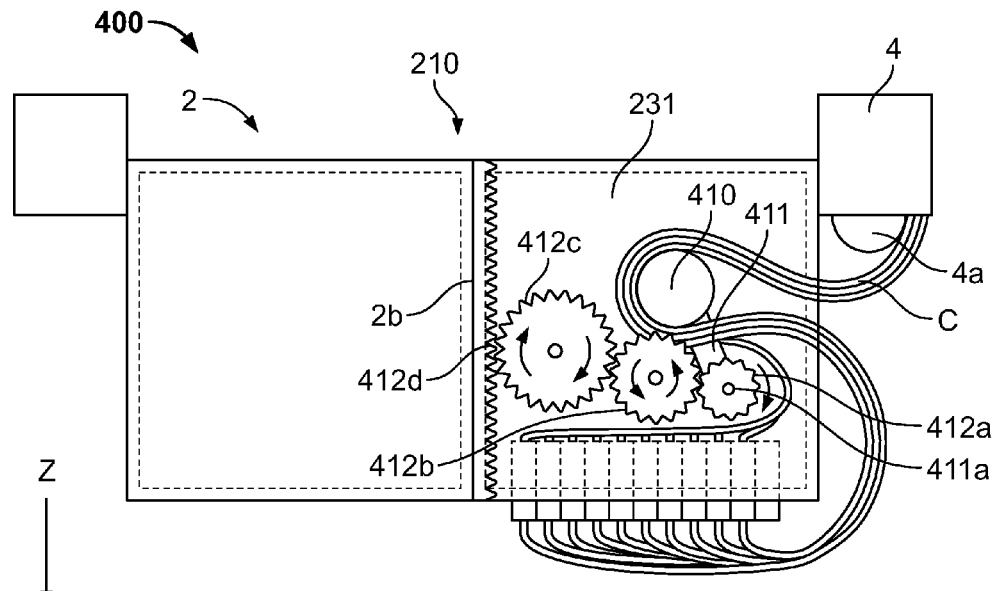
FIG. 5A is a top view of an embodiment of an on-tray cable management system in a first position.
Figure 5B:
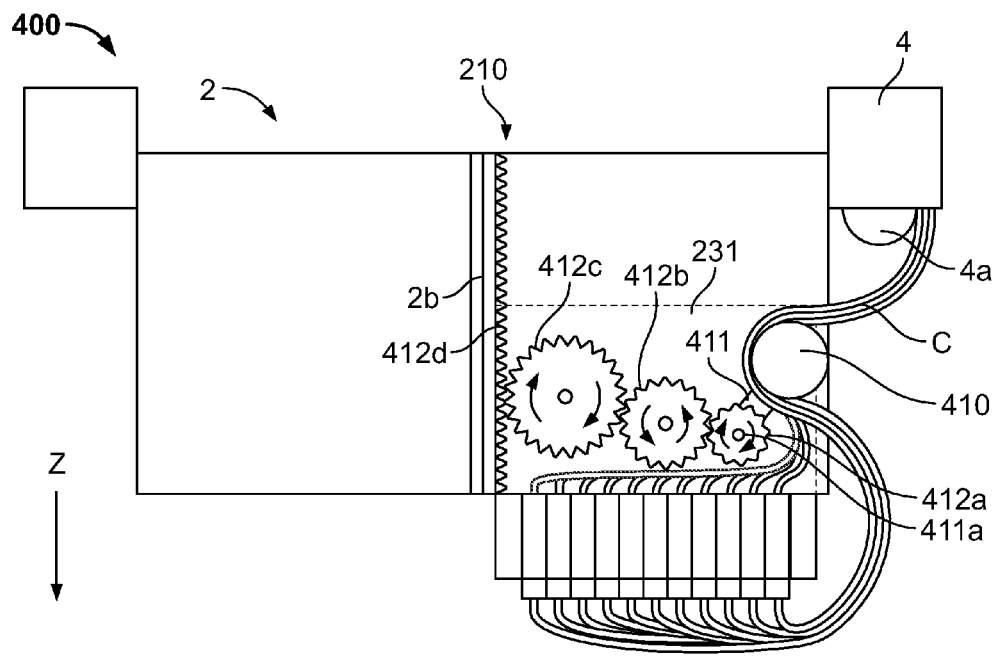
FIG. 5B is a top view of the on-tray cable management system of FIG. 5A at an intermediate position between the first position and a second position.
Figure 5C:
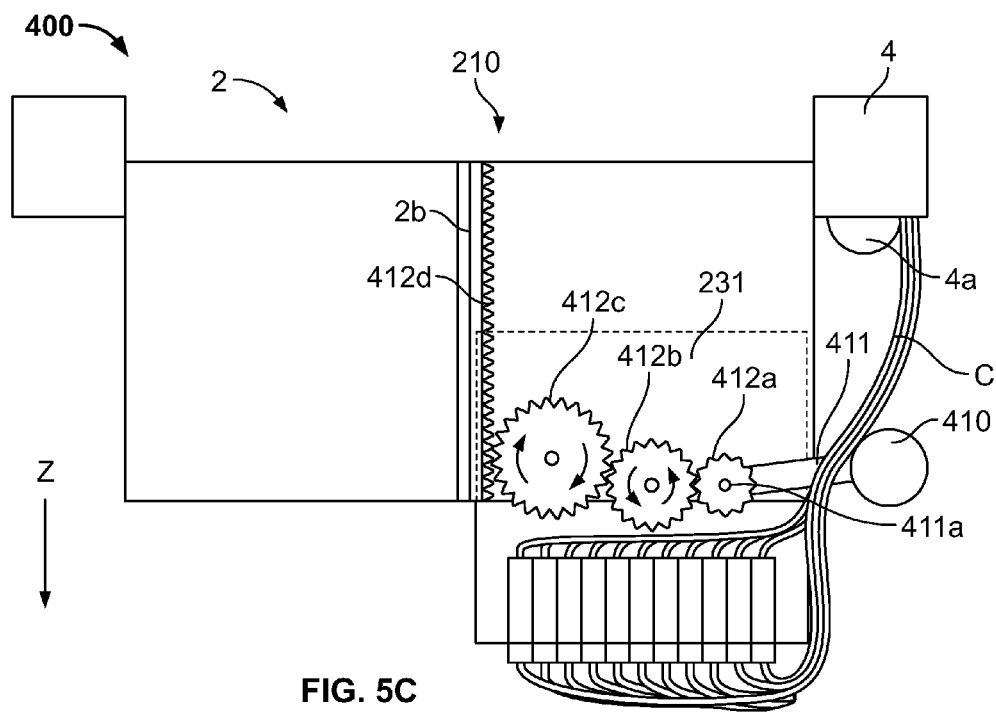
FIG. 5C is a top view of the on-tray cable management system of FIG. 5A in the second position.

As shown in FIGS. 5A-C, the cable management system 400 may be coupled to patch panel device 210. The cable management system 400 may include a cable retainer 410 which is connected to a retention arm 411 pivotably attached to a distal portion of tray 231 of the device 210 at a pivot point. The retainer 410 may be shaped and positionable, such that at any position of the retainer 410, any portion of a cable C extending along or in tension against the retainer 410 has at least a minimum radius of curvature, thereby avoiding damage to the cable C and/or maintaining a desired level of optical energy transmittance through the cable C. The retainer 410 may have an outer surface that is substantially smooth or may be rotatably mounted to arm 411, or both, in order to avoid friction between the cable C and the retainer 410 when the cable C moves along or over the outer surface of the retainer 410. The arm 411 may be transitionable from a first position (FIG. 5A) through an intermediate position (FIG. 5B) to a second position (FIG. 5C), which corresponds to movement of the tray 231 from a position within the housing 2 to a position at which the tray 231 is partially outside of the housing 2 and is disposed a maximum distance away from the distal side of the housing 2. The first position may allow for organized storage of the cables C in a distal portion of the tray 231, whereas the second position may allow for convenient access to the cables C when the tray 231 is pulled away from the housing 2.

In the embodiment illustrated in FIGS. 5A-C, the retention arm 411 may be at all times pivotally engaged with a first gear 412a at pivot point 411a on the distal portion of the tray 231. The gear 412a may be mechanically engaged with a second gear 412b, which may be mechanically engaged with a third gear 412c, which in turn may be mechanically engaged with a linear gear 412d disposed within the housing 2, along the side adjacent the guide rail 2b. Gears 412a, 412b, and 412c may be translationally (but not rotationally) fixed to the tray 231, while the linear gear 412d may be stationary with respect to the housing. The gears 412a, 412b, 412c, and 412d may form in part or in whole an actuation mechanism configured to cause pivotable motion of the cable retainer 410 from a first position to a second position, although other types of actuation mechanisms may be suitable.

In an exemplary operation, as tray 231 is pulled in direction Z, third gear 412c rotates clockwise so as to move in the direction Z along the length of linear gear 412d, thereby driving rotation of second gear 412b counterclockwise, which in turn rotationally drives gear 412a clockwise. The clockwise rotation of gear 412a may cause the retention arm 411 and retainer 410 to transition from the first position, through the intermediate position, to the second position where the tray 231 is in the fully pulled-out position. When the tray 231, from a pulled out position such as shown in FIG. 5C, is pushed back into the housing 2, the third gear 412c may rotate counterclockwise so as to move along the length of linear gear 412d (in the opposite direction to Z), causing clockwise rotation of the second gear 412b, which in turn causes gear 412a to rotate counterclockwise, thereby causing the retention arm 411 and retainer 410 to transition and return to the first position. The gear ratios of the first, second, third, and linear gears 412a, 412b, 412c, 412d may be adjusted as necessary to achieve transition of retention arm 411 from the first position to the second position and vice versa. Additionally, it is to be understood that, depending on factors such as the width of each tray 231 or the size of each gear, a larger or smaller set of gears and/or fewer or more gears may be used to achieve the same or a similar result.

Figure 6A:
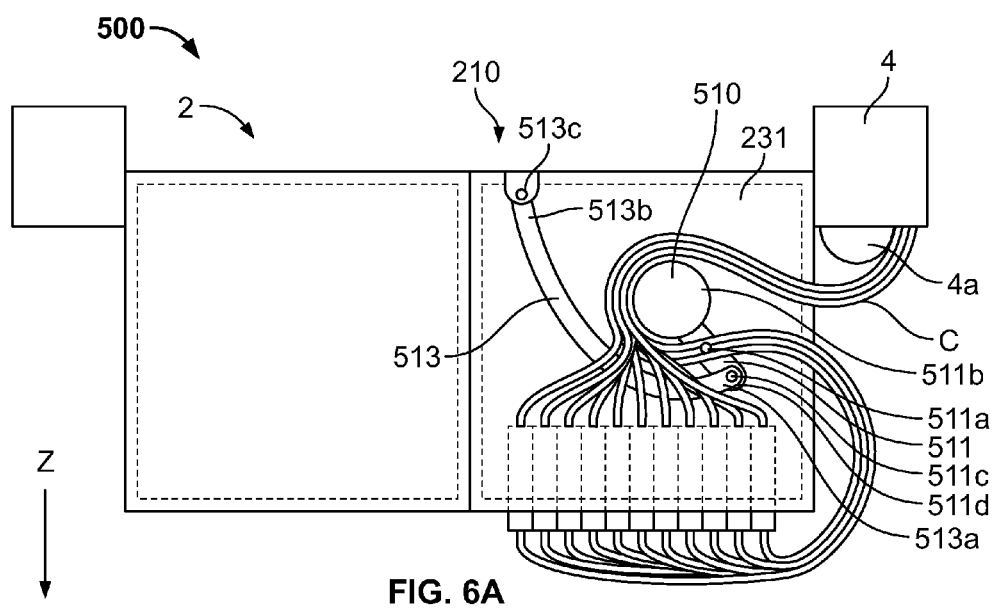
FIG. 6A is a top view of another embodiment of an on-tray cable management system in a first position.
Figure 6B:
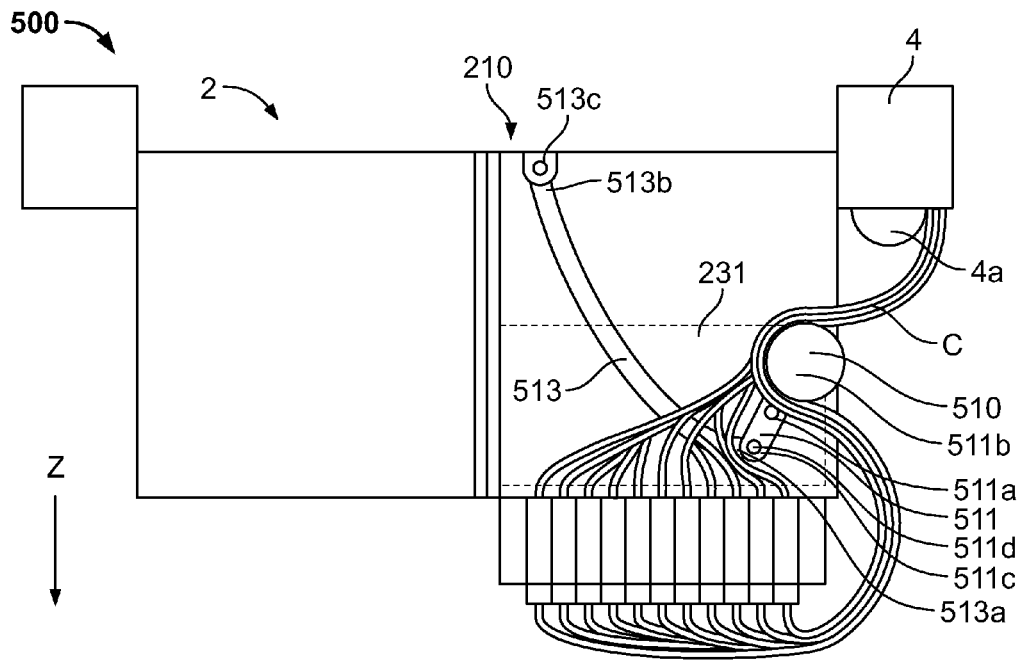
FIG. 6B is a top view of the on-tray cable management system of FIG. 6A at an intermediate position between the first position and a second position.
Figure 6C:
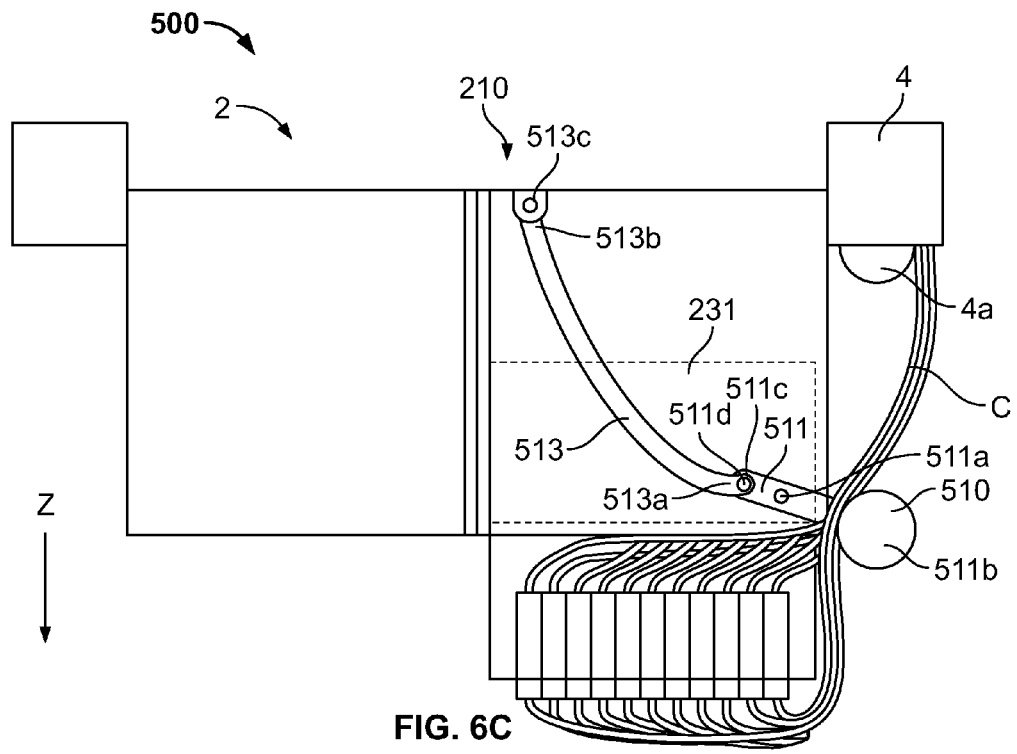
FIG. 6C is a top view of the on-tray cable management system of FIG. 6A in the second position.

FIGS. 6A-C illustrate another embodiment of a cable management system 500 that has a similar functionality to cable management system 400. In this embodiment, a retention arm 511 may have a first end 511b and a second end 511c opposite the first end 511b. The retention arm 511 may be pivotably engaged (but translationally fixed) with tray 231 at a first pivot point 511a. Pivot point 511a may be disposed along a region of the arm 511 intermediate first end 511b and second end 511c. The cable retainer 510 may be coupled to first end 511b and a second pivot point 511d is disposed at the second end 511c, at which point the retention arm 511 is pivotably engaged with a first end 513a of a chassis arm 513. Chassis arm 513 may be connected at a third pivot point 513c at a second end 513b, which is opposite the end 513a, and pivotably coupled to a distal side of housing 2. With this configuration, the chassis arm 513 may be coupled at a fixed position along the distal side of the housing 2, while maintaining the ability to rotate at the third pivot point 513c. An angle-limiting mechanism (not shown) may be placed at one or both of the second and third pivot points 511d, 513c to help ensure the desired transition of the tray 231 from the first position (FIG. 6A), through an intermediate position (FIG. 6B), to the second position (FIG. 6C) and vice versa. The chassis arm 513, alone or in combination with the retention arm 511, may form in part or in whole an actuation mechanism configured to cause pivotable movement of the cable retainer 510 from a first position to a second position, although other types of actuation mechanisms may be suitable.

In an exemplary operation, as tray 231, when stored in the housing 2 (such as shown in FIG. 6A), is pulled in direction Z, chassis arm 513 pivots clockwise about third pivot point 513c, thereby pulling retention arm 511 at second pivot point 511c and causing the retention arm 511 to rotate clockwise about the first pivot point 511a. This may result in the retention arm 511 and cable retainer 510 to transition through an intermediate position (FIG. 6B) to the second position (FIG. 6C). As tray 231 is pushed into the housing, such as from the second position or any intermediate position, chassis arm 513 may pivot counterclockwise about third pivot point 513c, thereby pushing retention arm 511 at second pivot point 511d to cause the retention arm 511 to rotate counterclockwise about the first pivot point 511a and transition the retention arm 511 and cable retainer 510 to the first position. The length of the retention and chassis arms 511, 513, as well as the placement of the pivot points 511a, 511c, 513c relative to the tray 231 may be adjusted as necessary to achieve the transition of retention arm 511 from the first position to the second position and vice versa.

For both of the cable management systems 300 and 400, the disposition of the components thereof substantially and/or completely over and/or on the tray, when the tray is in the stored position within the housing, may permit the patch panel device used therewith to have a decreased depth in the distal area extending from the ports to the distal side of the tray, while providing for compact storage of cables C within the housing 2 and convenient access to the cables C when the tray is pulled from the housing 2.

Figure 7A:
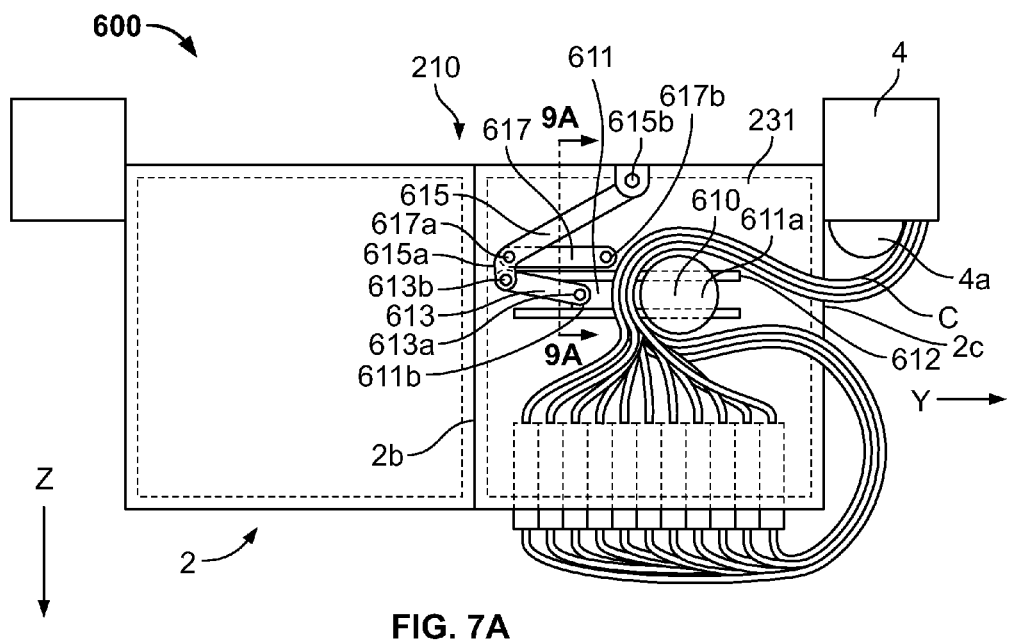
FIG. 7A is a top view of an embodiment of an arm-rail cable management system in a first position.
Figure 7B:
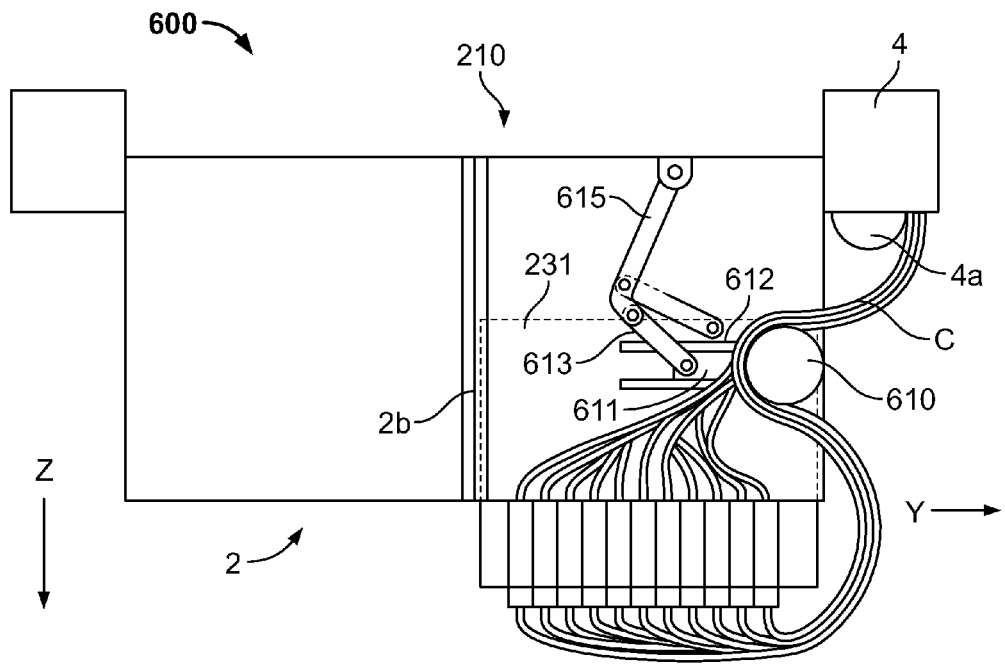
FIG. 7B is a top view of the arm-rail cable management system of FIG. 7A at an intermediate position between the first position and a second position.
Figure 7C:
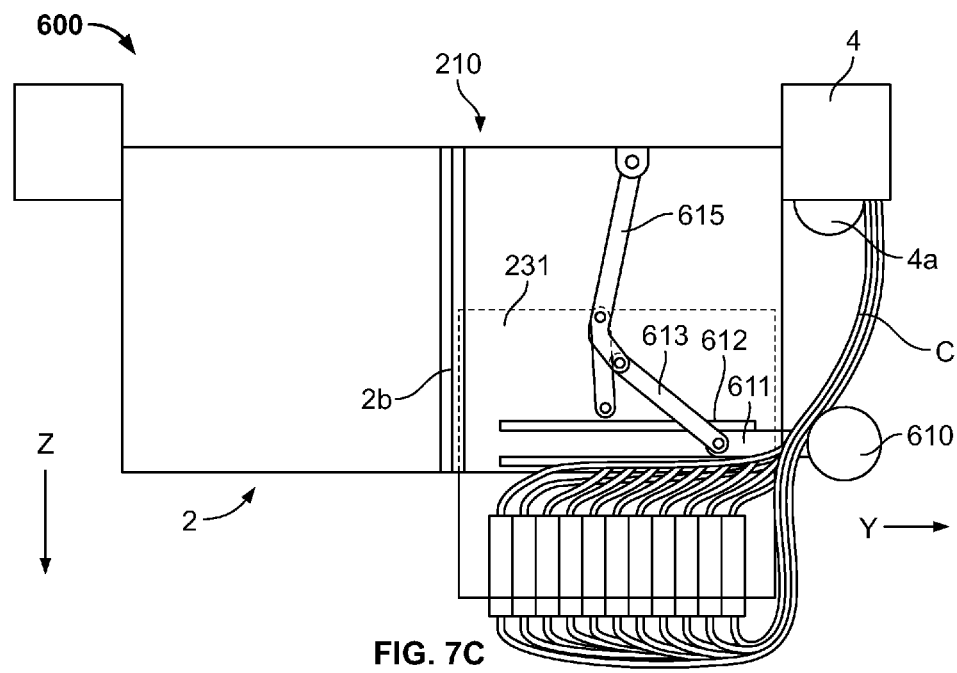
FIG. 7C is a top view of the arm-rail cable management system of FIG. 7A in the second position.

FIGS. 7A-C illustrate a further embodiment of a cable management system 600 used with patch panel device 210 in housing 2. The cable management system 600 may include a cable retainer 610 which is connected to a first end 611a of a slide 611 opposite a second end 611b. The slide 611 may be slidably engaged with a rail 612 which is fixedly attached to a distal portion of the tray 231 and extends in a direction parallel to direction Y. In one embodiment (illustrated in FIG. 9B), a mechanical sliding means 650, such as small rollers, may be disposed between the slide 611 and the tray 231 or interior facing surfaces of the rail 612 to facilitate smooth and low-friction movement of the slide 611 against the tray 231.

The slide 611 may be movable only in the direction Y and opposite to the direction Y, based on its engagement with the rail 612. A first arm 613 having a first end 613a and a second end 613b may be pivotably engaged at the first end 613a with the second end 611b of the slide 611. A second arm 615, having a first end 615a and a second end 615b may be pivotally engaged at the first end 615a with the second end 613b of the first arm 613 and pivotally engaged at its second end 615b with a distal portion of the housing 2.

The attachment of the cable management system 600 to the housing 2 and the patch panel device 210 may allow the system to serve as a guide and support member for one side of the tray 231. As shown, the housing 2, to which the cable management system 600 is coupled, may include a tray guide 2b on one side of the tray 231, but not on the opposite side 2c. Instead, support at the opposite side 2c of tray 231 may be effected by the cable management system 600. As such, the system 600 desirably may be affixed to the distal side of the housing as close as possible to the side 2c of the tray 231 opposite the guide rail 2b so as to provide sufficient support for the patch panel device 210, especially when the tray 231 thereof is in the pulled-out position as shown in FIG. 7C.

The retainer 610 may be shaped such that any portion of a cable C extending along or in tension against the retainer 610 has at least a minimum radius of curvature, thereby avoiding damage to the cable C and/or maintaining a desired level of optical energy transmittance through the cable C. The retainer 610 may have an outer surface that is substantially smooth or may be rotatably mounted to slide 611, or both, in order to avoid friction between the cable C and the retainer 610 when the cable C moves along or over the retainer outer surface. The retainer 610 may be transitionable between a first position (FIG. 7A), through one or more intermediate positions (FIG. 7B), and to a second position (FIG. 7C), which corresponds to movement of the tray 231 from a position within the housing 2 to a position at which the tray is at least partially outside of the housing 2 and may be disposed a maximum distance away from the distal side of the housing 2. The first position may allow for organized storage of the cables C in a distal portion of the tray 231, whereas the second position may allow for convenient access to the cables C when the tray 231 is pulled from the housing 2.

Referring still to FIGS. 7A-C, in addition to the first arm 613 and second arm 615, cable management system 600 may include a third arm 617. The third arm 617 may have a first end 617a and a second end 617b. The first end 617a may be pivotally engaged to a portion of the second arm 615 between the first and second ends 615a, 615b. The second end 617b may be pivotably attached to the tray 231. At the pivotable engagements between the first and second arms 613, 615 and the second and third arms 615, 617, a mechanical means (not shown) to limit the range of pivotable motion may be disposed thereon in order to help ensure the proper transition of the system 600 from the first position (FIG. 7A) to the second position (FIG. 7C) and vice versa.

In an exemplary operation, as tray 231, which may be stored in the housing as shown in FIG. 7A, is pulled in direction Z, the movement of tray 231 in direction Z may simultaneously effect the counterclockwise rotation of second arm 615 about its pivot connection with housing 2 at its second end 615*b* and the clockwise rotation of third arm 617 about its pivot connections to both the tray 231 at its second end 617*b* and second arm 615 at its first end 617*a*, which may cause the first arm 613 to act upon the slide 611. As the tray 231 moves proximally, first arm 613 pushes slide 611 in direction Y and may rotate clockwise, counterclockwise, or not at all about its pivot connections at the slide 611 and the second arm 615, depending on the size and orientation of first arm 613 relative to the slide 611 and the second arm 615. As a result, slide 611 may be pushed along rail 612, causing retainer 610 to move in direction Y, through intermediate positions such as shown in FIG. 7B, towards the second position. In the second position, the retainer 610 at least partially projects away from the tray 231 at the side 2*c*. The first arm 613, second arm 615, and third arm 617 may form, in part or in whole, an actuation mechanism configured to cause movement of the cable retainer 610 from a first position to a second position, although other types of actuation mechanisms may be suitable.

When the tray 231 is pushed into the housing 2, such as from the second position (FIG. 7C), the movement of tray 231 distally into the housing 2 may simultaneously effect the clockwise rotation of second arm 615 about its pivot connection with housing 2 at its second end 615*b* and the counterclockwise rotation of third arm 617 about its pivot connections to both the tray 231 at its second end 617*b* and second arm 615 at its first end 617*a*, which may cause the first arm 613 to act upon the slide 611. As the tray 231 moves distally, first arm 613 may pull slide 611 in a direction opposite to Y and may rotate clockwise, counterclockwise, or not at all about its pivot connections at the slide 611 and the second arm 615, depending on the size and orientation of first arm 613 relative to the slide 611 and the second arm 615. As a result, slide 611 may be pulled along rail 612 in the direction opposite to Y, causing retainer 610 to move in the same direction to obtain the first position (FIG. 7A), over the tray 231.

The orientations of, and the range of rotation of the pivotable connections among, the first, second, and third arms 613, 615, 617 may be in a manner such that the cable management system 600 is restricted to the path of movement between the first position (FIG. 7A), through the intermediate position (FIG. 7B), to the second position (FIG. 7C). As such, the first, second, and third arms 613, 615, 617 may be restricted from rotating into a position in which the length of an arm is perpendicular or parallel to the distal side of the housing 2.

Figure 8A:
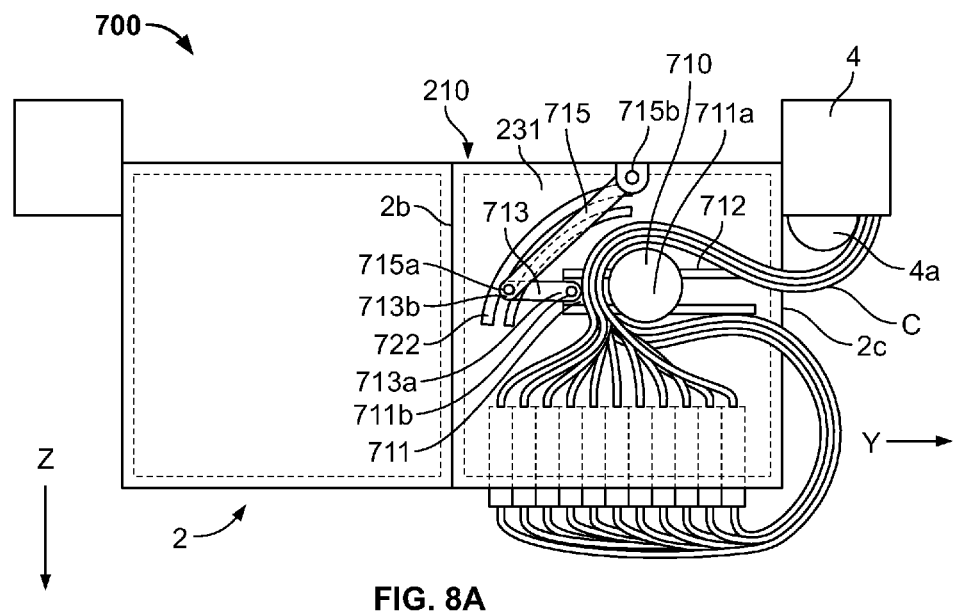
FIG. 8A is a top view of another embodiment of an arm-rail cable management system in a first position.
Figure 8B:
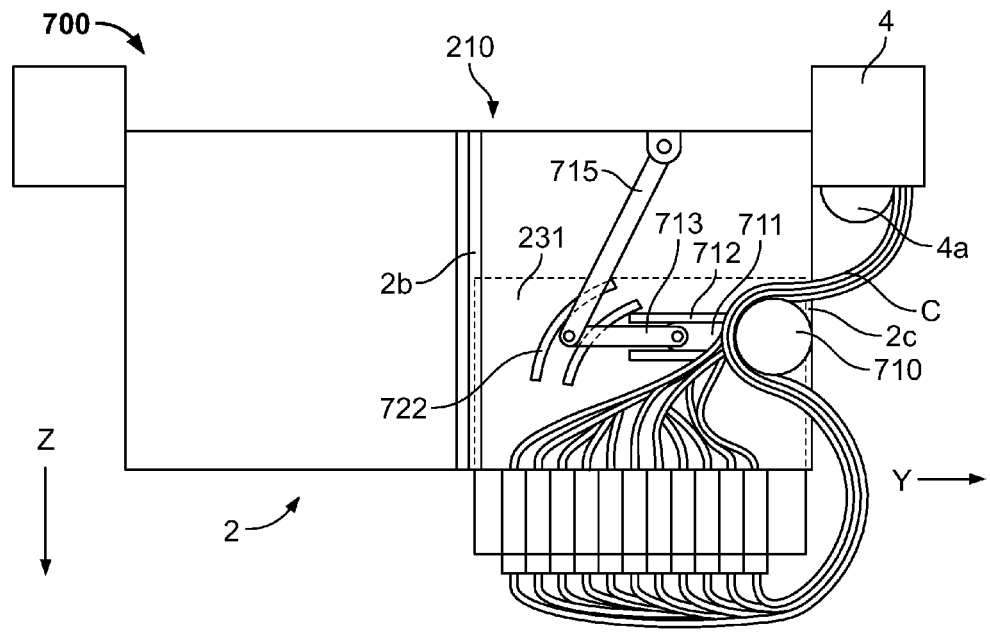
FIG. 8B is a top view of the arm-rail cable management system of FIG. 8A at an intermediate position between the first position and a second position.
Figure 8C:
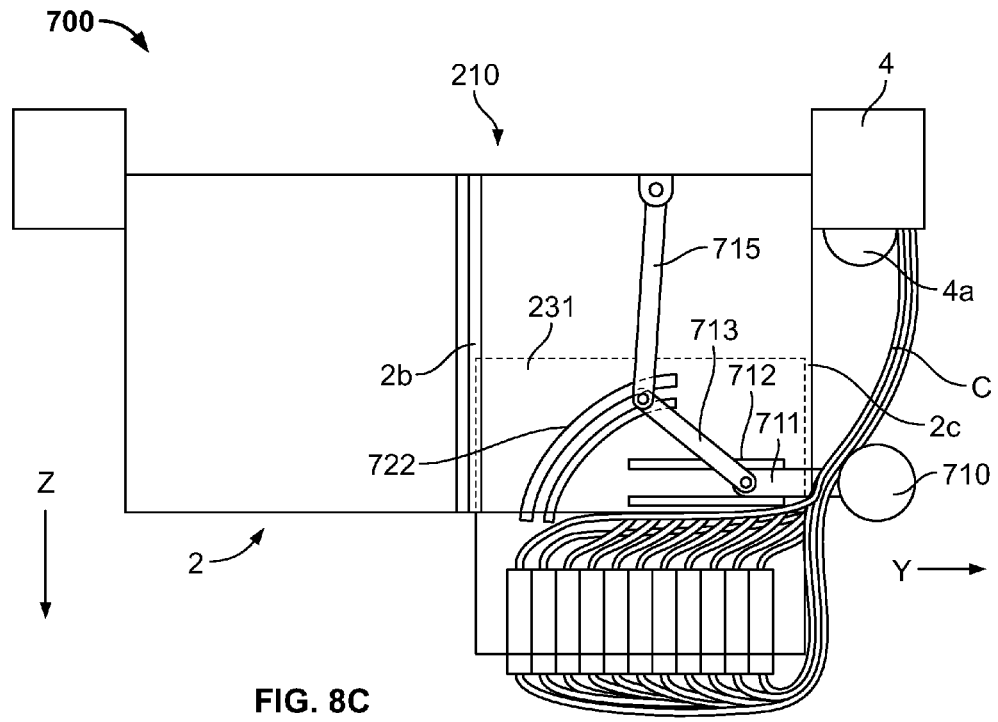
FIG. 8C is a top view of the arm-rail cable management system of FIG. 8A in the second position.

Another embodiment of a cable management system 700 with features similar to that of cable management system 600 is illustrated in FIGS. 8A-C. In cable management system 700, cable retainer 710 is coupled to slide 711 at a first end 711*a* opposite a second end 711*b*. Slide 711 may be coupled to rail 712. Cable retainer 710, slide 711, and rail 712 may be structurally and/or functionally similar or identical to the corresponding components of cable management system 600. Cable management system 700 may include a first arm 713 with a first end 713*a* of the first arm 713 being pivotably engaged with the slide 711 at its second end 711*b*. The first arm 713 may be pivotably attached at its second end 713*b* to a first end 715*a* of a second arm 715. The second arm 715 may be pivotably engaged at its second end 715*b* to a distal portion of the housing 2. In addition, first arm 713 may be slidably engaged, at its connection with the second arm 715, with an arcuate second rail 712 fixed to a distal portion of the tray 231. It is to be understood that alternative means such as the mechanical means 650 illustrated in FIG. 9B may be incorporated to provide for the engagement between the first arm 713 and the second rail 722. At the pivotal engagements between the first and second arms 713, 715 and the second arm 715 and housing 2, a mechanical means (not shown) to limit the range of pivotable motion may be disposed thereon in order to help ensure the proper transition of the system 700 from the first position (FIG. 8A) to the second position (FIG. 8C) and vice versa. The first arm 713 and second arm 715 may form in part or in whole an actuation mechanism configured to cause movement of the cable retainer 710 from a first position to a second position, although other types of actuation mechanisms may be suitable.

In an exemplary operation, as tray 231, which may be stored in the housing as shown in FIG. 8A, is pulled in direction Z, the movement of tray 231 in direction Z may effect movement of the first end 715*a* of second arm 715 along the second rail 722. This movement along the second rail 711 may be guided by the connection of the second arm 715 with first arm 713, which is connected with rail 722. The movement of second arm 715 along the second rail 722 may also be guided by the fixed connection of the second arm 715 with the housing 2 at its second end 715*b*. This in turn may cause first arm 713 to act upon slide 711. As the tray 231 moves proximally, first arm 713 pushes slide 711 in direction Y and may rotate clockwise, counterclockwise, or not at all about its pivot connections at the slide 711 and the second arm 715, depending on the size and orientation of the first arm 713 relative to the slide 711 and second arm 715. As a result, slide 711 may be guided along first rail 712, causing retainer 710 to move in direction Y towards the second position (FIG. 8C). In the second position, the retainer 710 may at least partially project away from the tray 231 at the side 2*c*.

When the tray 231 is pushed into the housing 2, such as from the second position (FIG. 8C) the movement of tray 231 distally into the housing 2 may effect movement of the first end 715*a* of second arm 715 along the second rail 722, guided by its connection with first arm 713, which is connected with second rail 722, as well as its fixed connection with the housing 2 at second end 715*b*. This in turn may cause first arm 713 to act upon slide 711. As the tray 231 moves distally, first arm 713 may pull slide 711 in a direction opposite to Y and may rotate clockwise, counterclockwise, or not at all about its pivot connections at the slide 711 and the second arm 715, depending on the size and orientation of the first arm 713 relative to the slide 711 and second arm 715. As a result, slide 711 may be pulled along first rail 712 in the direction opposite to Y, causing retainer 710 to move in the same direction, through intermediate positions, such as shown in FIG. 8B, to obtain the first position (FIG. 8A), over the tray 231.

For both systems 600 and 700, the systems may be configured to be affixed to the tray 231 and affixed only to a distal portion of the housing 2, thereby allowing the patch panel device 210 used therewith to have a decreased depth in the distal area behind the ports, while providing for compact storage of cables C within the housing 2 and convenient access to the cables C when the tray is pulled from the housing 2.

Figure 9A:
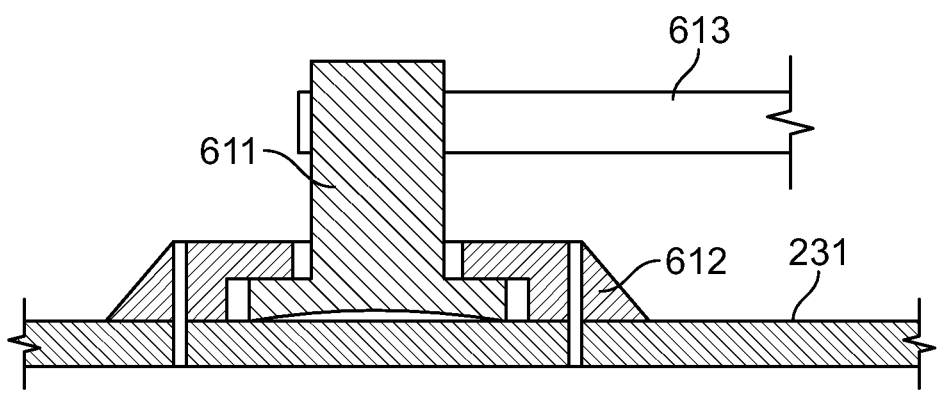
FIG. 9A is a cross-sectional view of FIG. 7A at cross-sectional line 9A-9A.
Figure 9B:
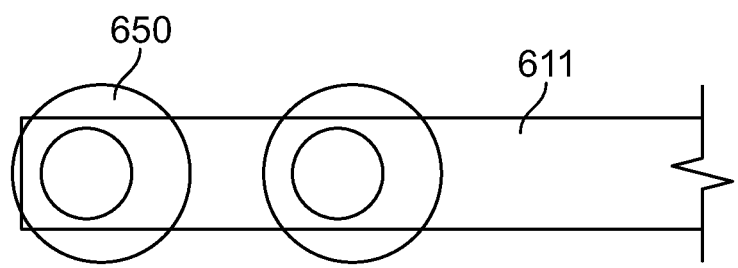
FIG. 9B is a side view of an embodiment of a slide means for an arm-rail cable management system in accordance with the present disclosure.

FIG. 9A illustrates a cross-sectional view of slide 611 along line 9A-9A of FIG. 7A. As shown, the slide 611 may be slidably engaged with the rail 612 which may be fixedly attached to the distal portion of the tray 231 and extend in a direction parallel to direction Y. The slide 711 and rail 712 may have a similar or identical structure to what is shown in FIG. 9A. As noted above, FIG. 9B illustrates a mechanical sliding means 650, in particular small rollers, which may be disposed between the slide 611 and the tray 231 or interior facing surfaces of the rail 612 to facilitate smooth and low-friction movement of the slide 611 against the tray 231. This same feature may be applied to the slide 711 and rail 712 of cable management system 700, and may also be applied to the second rail 722 of cable management system 700.

Figure 10A:
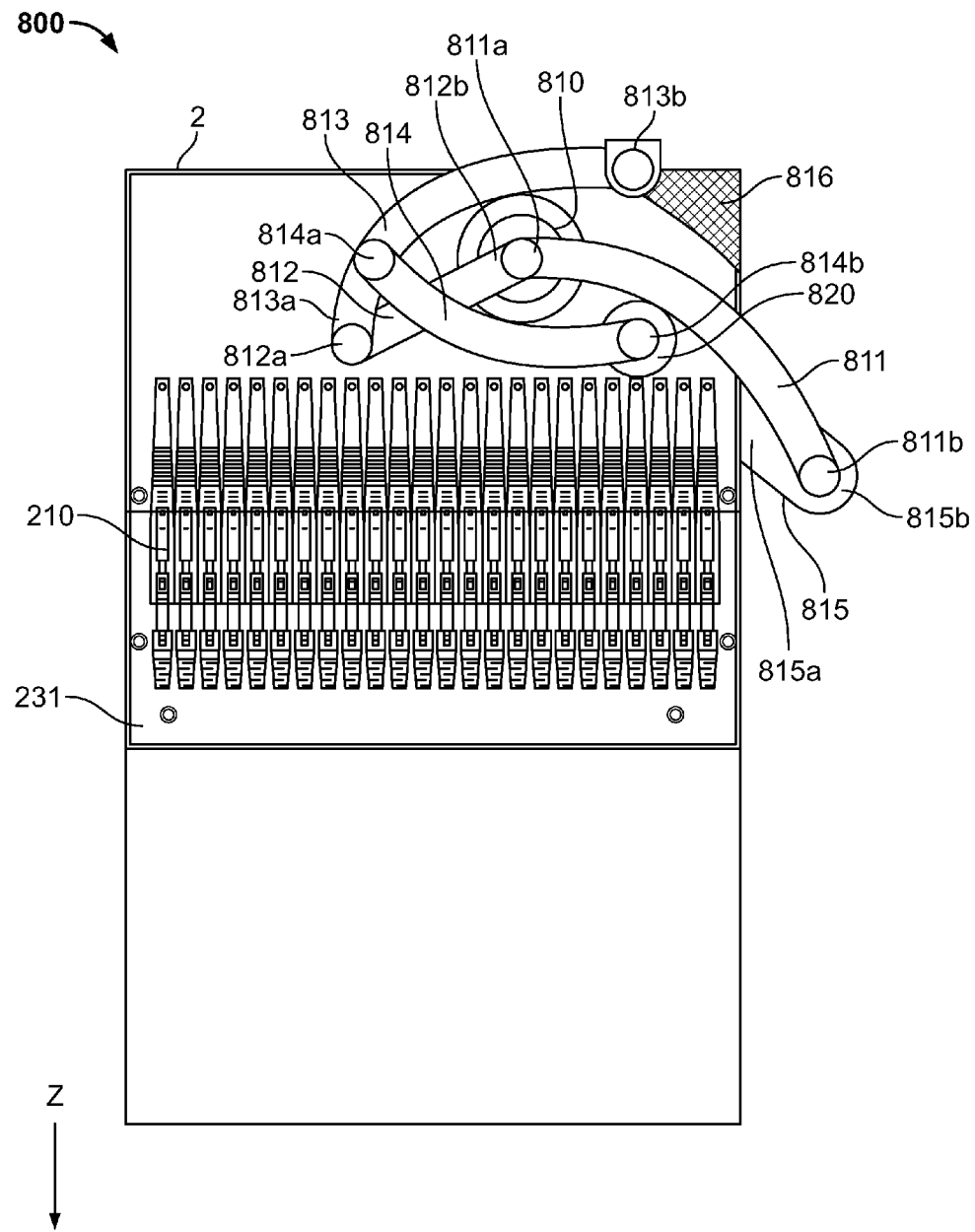
FIG. 10A is a top view of a multi-arm cable management system in a first position.
Figure 10B:
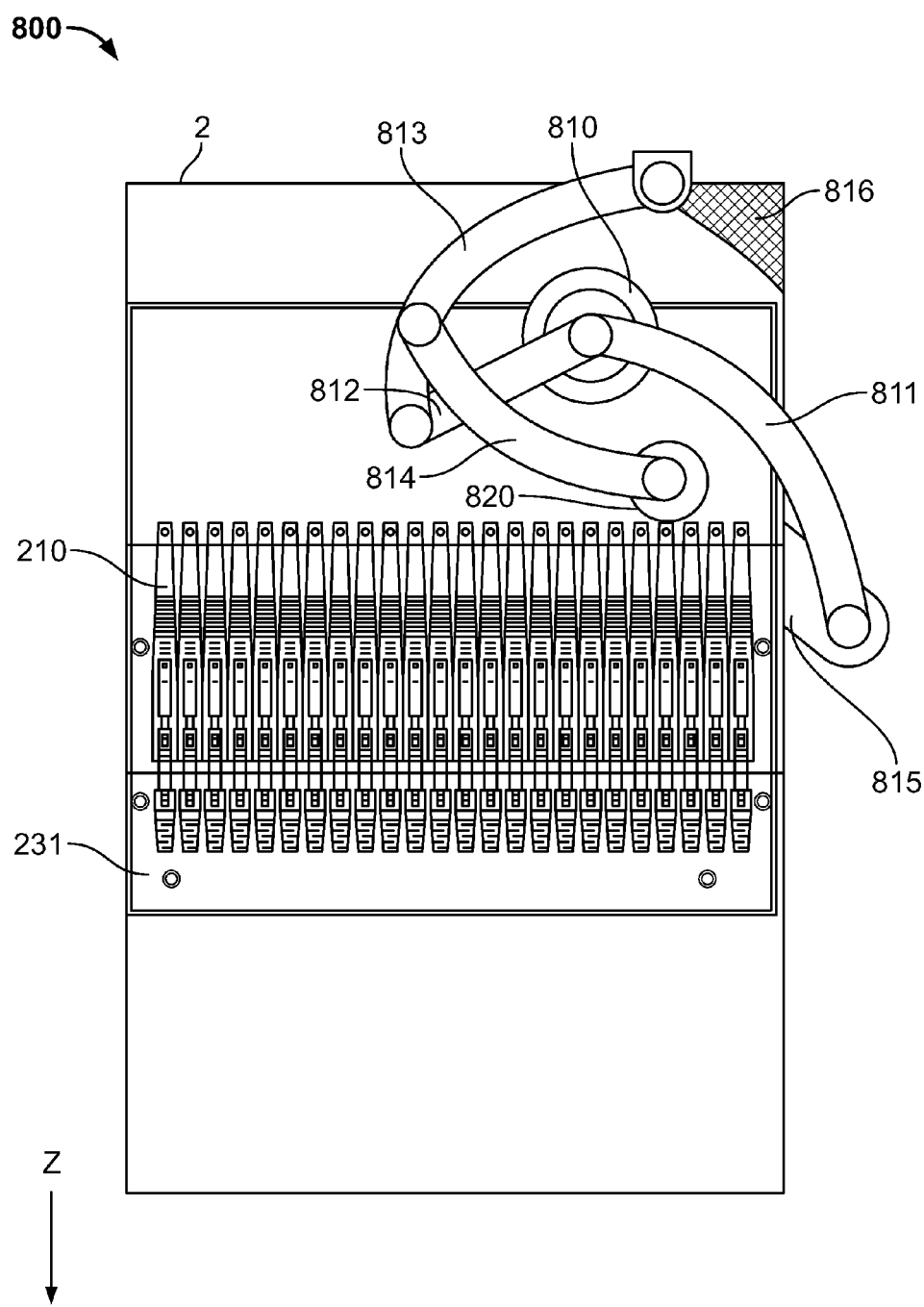
FIG. 10B is a top view of the multi-arm cable management system of FIG. 10A at an intermediate position between the first position and a second position.
Figure 10C:
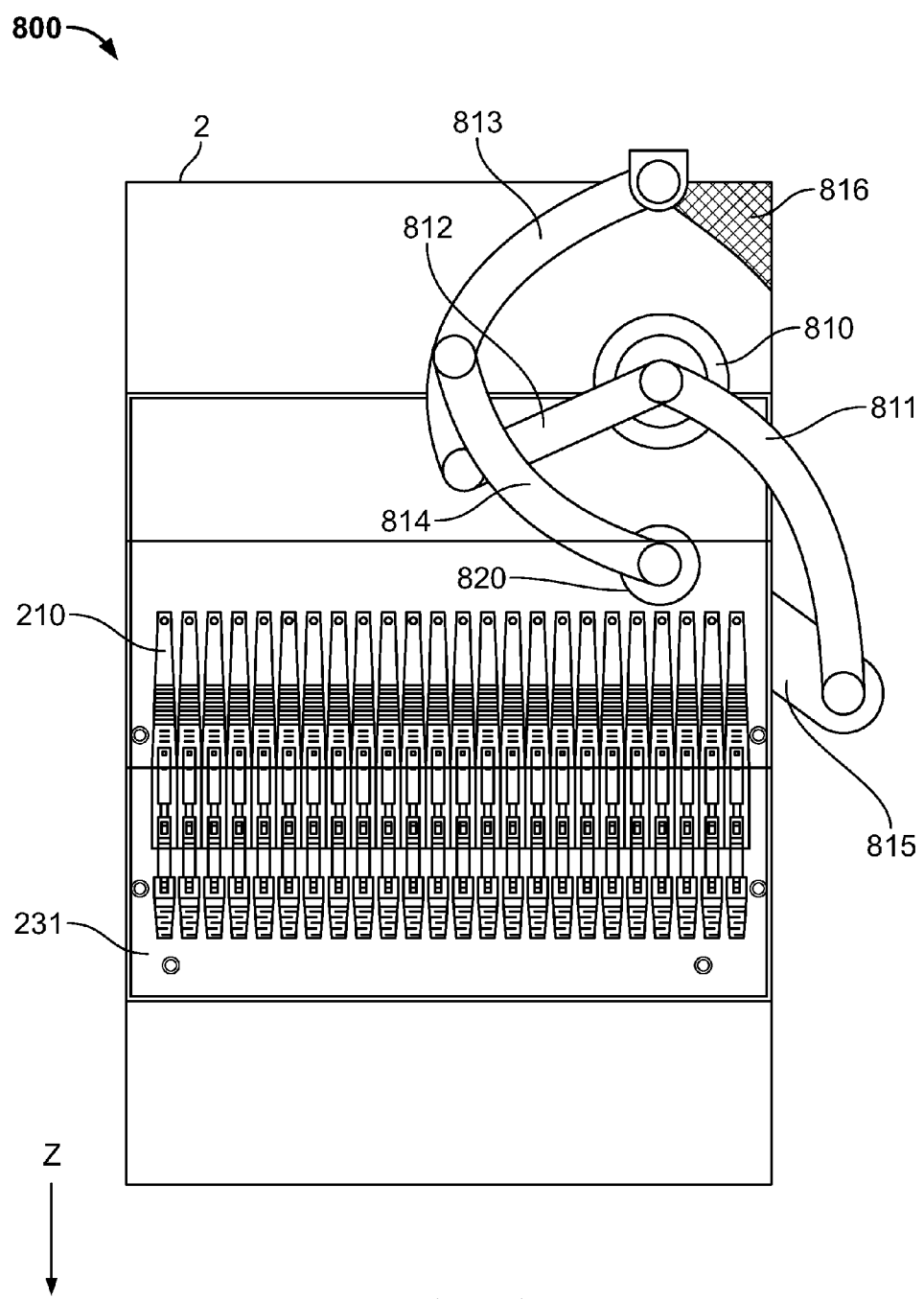
FIG. 10C is a top view of the multi-arm cable management system of FIG. 10A at another intermediate position between the first position and the second position.
Figure 10D:
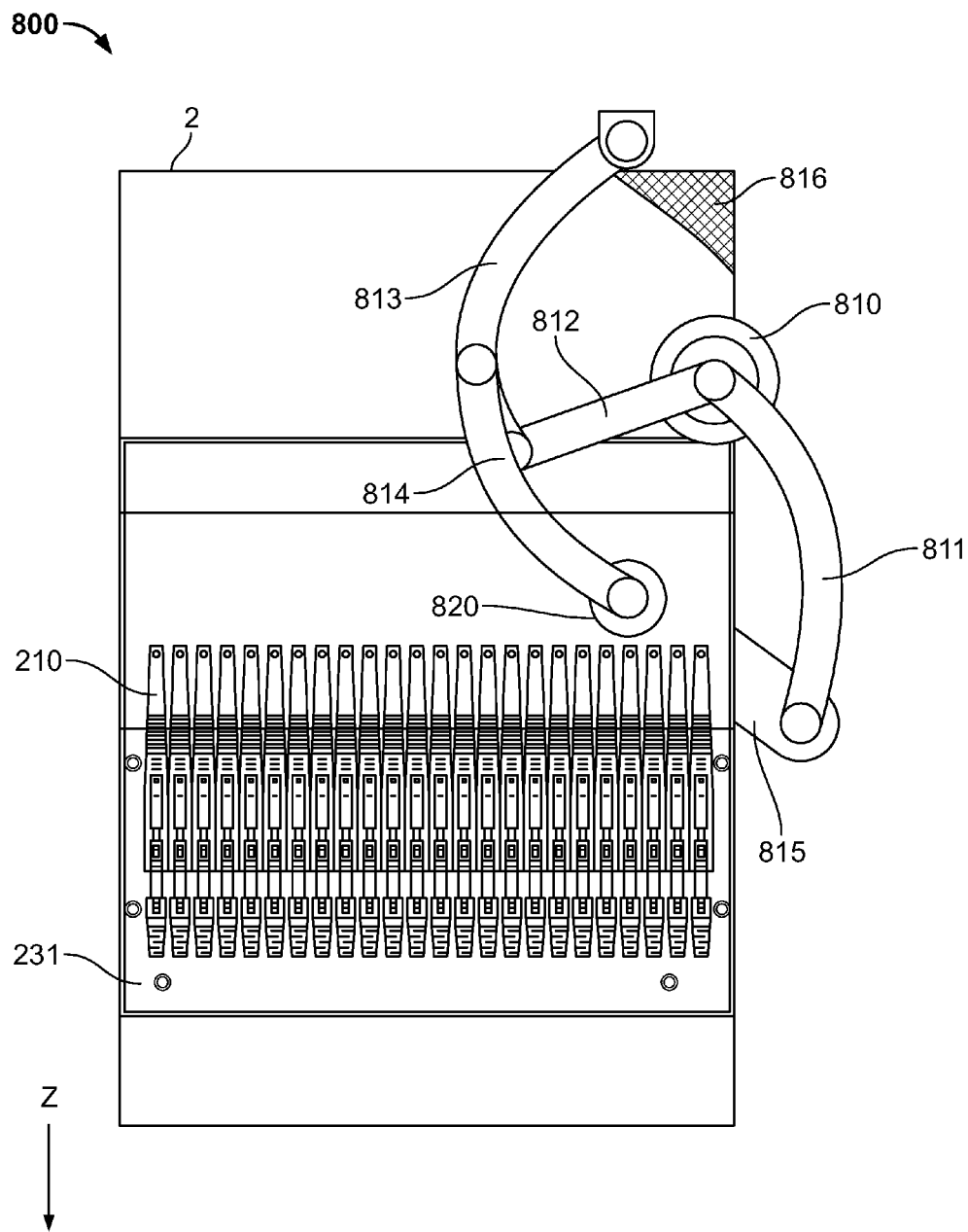
FIG. 10D is a top view of the multi-arm cable management system of FIG. 10A at yet another intermediate position between the first position and the second position.
Figure 10E:
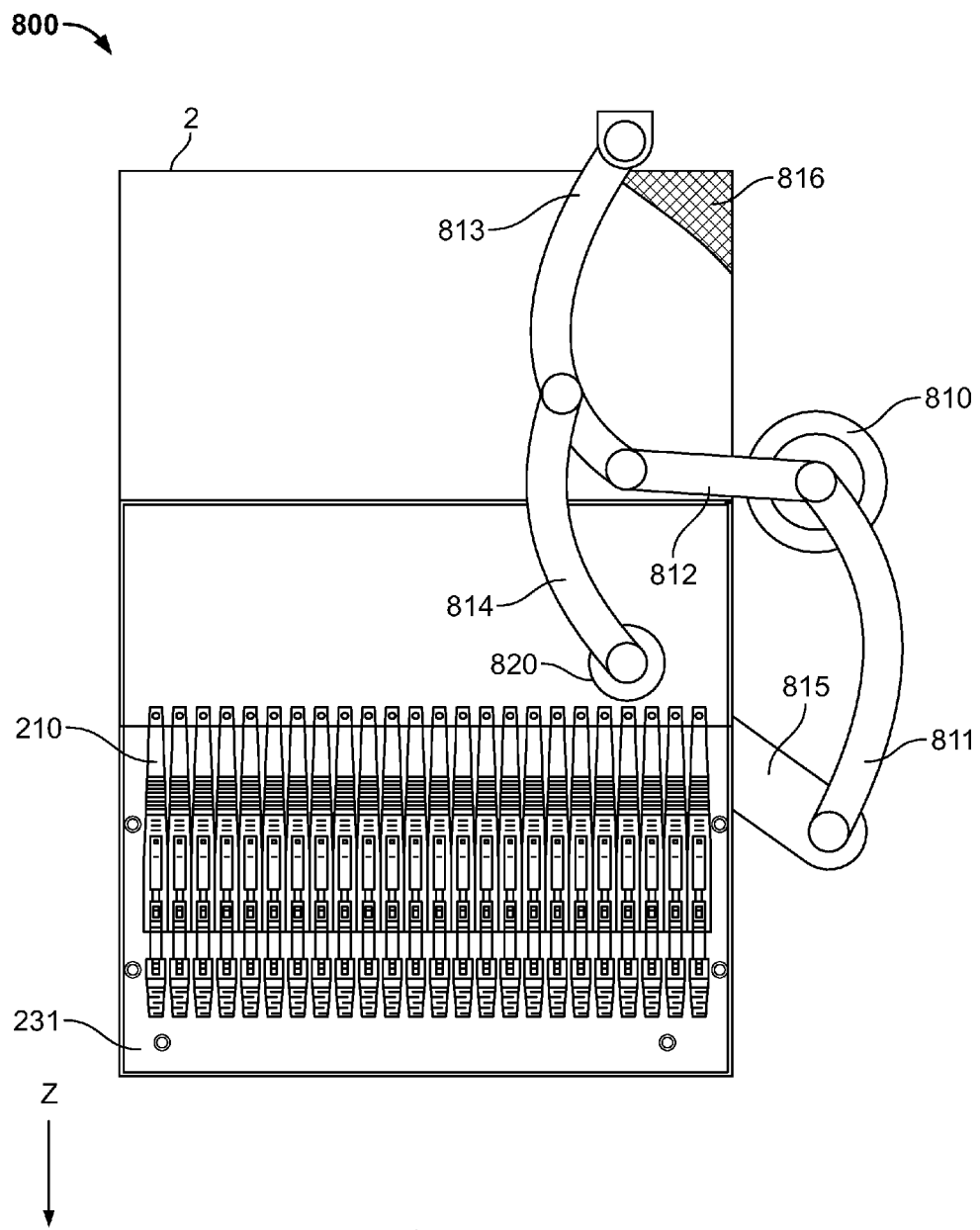
FIG. 10E is a top view of the multi-arm cable management system of FIG. 10A in the second position.
Figure 10F:
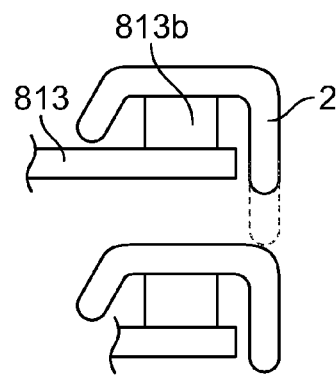
FIG. 10F is a cross-sectional view of an exemplary connection between the multi-arm cable management system of FIG. 10A and a housing.
Figure 10G:
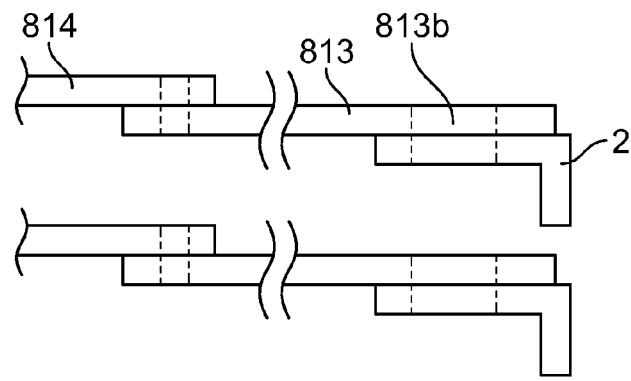
FIG. 10G is a cross-sectional view of an alternative exemplary connection between the multi-arm cable management system of FIG. 10A and a housing.
Figure 10G:
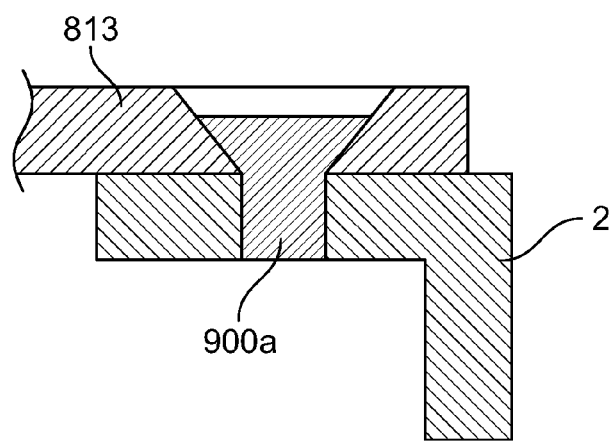
Figure 10H:
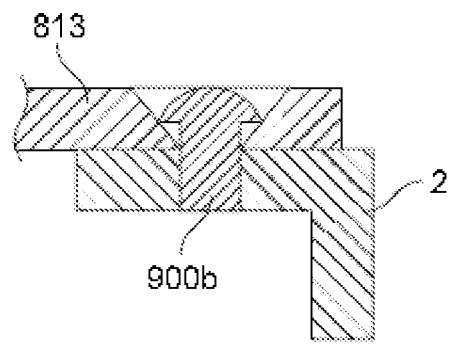
FIG. 10H is a top view of a fourth arm of the multi-arm cable management system of FIG. 10A.
Figure 10H:
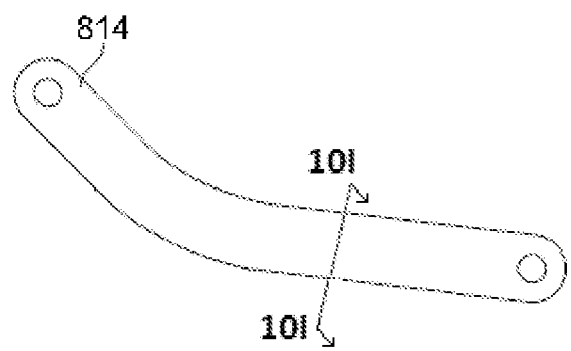
Figure 10I:
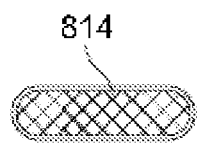
FIG. 10I is a cross-sectional view of the fourth arm taken along the line 10I-10I of FIG. 10H.

Another embodiment of a patch panel cable management system 800 is illustrated in FIGS. 10A-L. Referring to FIG. 10A, the cable management system 800 may be coupled to a patch panel device 210. The cable management system 800 may include a first arm 811 having a first end 811a and a second end 811b, a second arm 812 having a first end 812a and a second end 812b, a third arm 813 having a first end 813a and a second end 813b, a fourth arm 814 having a first end 813a and second end 813b, and a flange 815 having a first end 815a and a second end 815b. As shown in FIGS. 10H and 10I, fourth arm 814 may define a nonlinear shape and rounded or angled edges. If fourth arm 814 is positioned on top of the other arms 811-813, the edges of arm 814 may be more likely to catch components of another patch panel device stacked immediately vertically above fourth arm 814 during relative translational movement between the vertically adjacent patch panel devices. As such, one or more edges of fourth arm 814 may be angled, rounded, or otherwise smoothed to reduce the likelihood of arm 814 catching or otherwise interfering with a component of an above-positioned patch panel device.

Pivotal engagement mechanisms may be disposed at the first and second ends of each of the first, second, third, and fourth arms. The flange 815 may be fixedly attached at its first end 815a to an underside of tray 231 and to the first arm 811 at its second end 815b. The first arm 811 may be pivotally engaged with the flange 815 and the second arm 812, which may be pivotally engaged to the third arm 813, which may be pivotally engaged to a distal portion of the housing 2. As shown in FIGS. 10F and 10G, the means of pivotal engagement between the third arm 813 and the housing 2 may vary; third arm 813 may, for example, hang from or rest on a portion of housing 2. Fourth arm 814 may be pivotally engaged to a portion of the third arm 813 between its first and second ends 813a, 813b. As shown in FIGS. 10G' and 10G" respectively, the third arm 813 may be connected to housing 2 via a connection means such as a countersunk bolt 900a or a rounded bolt 900b.

The system 800 may further include a first cable retainer 810 (best illustrated in FIG. 10J), which may include a pivotable engagement mechanism for pivotably engaging the first end 811a of first arm 811 to the second end 812b of second arm 812, an appendage 810a having a first guide 810b thereon, and a second guide 810c disposed at the second end 812b of second arm 812. The second end 812b of second arm 812 may further include a stopper 810d to define a position at which the appendage 810a is maximally retracted. In an alternative embodiment, the first retainer 810 may include a cover (not shown) over the appendage 810a to keep a portion of cables extending along and within the retainer 810.

A second cable retainer 820 may be pivotally attached to the second end 814b of the fourth arm 814. As shown in FIGS. 10K and 10L, second retainer 820 may be elliptically shaped and disposed a short distance above tray 231. In an exemplary implementation, a portion of cables (not shown) managed by the system 800 may be disposed within the first retainer 810, between an engagement mechanism 810e, which is near or at the center of the retainer 810 and pivotally engages the first and second arms 811, 812 to each other, and the perimeter of the retainer 810 defined by the first and second guides 810b, 810c. The cables may extend proximally from the retainer 810 and optionally contact the second retainer 820, depending on the position of the first and second retainers 810, 820 in relation to one another.

A fillet 816 may be disposed at a distal corner of housing 2, on the side from which the flange 815 extends from the tray 231.

The retainers 810, 820 may be shaped such that any portion of a cable C extending along or in tension against the retainers 810, 820 has at least a minimum radius of curvature, thereby avoiding damage to the cable C and/or maintaining a desired level of optical energy transmittance through the cable C (see FIGS. 10J-L). The retainers 810, 820 may have an outer surface that is substantially smooth in order to avoid friction between the cable C and the retainers 810, 820 when the cable C moves along or over the retainer outer surface. The retainers 810, 820 may be transitionable between a first position (FIG. 10A), and a second position (FIG. 10E), which corresponds to movement of the tray 231 from a position at which the tray 231 is completely within the housing 2 (FIG. 10A) to a position at which a portion of the tray 231 is outside of the housing 2 (FIG. 10E) and disposed a maximum distance away from the distal side of the housing 2. The first position may allow for organized storage of the cables C in a distal portion of the tray 231, whereas the second position (FIG. 10E) allows for convenient access to the cables C when the tray 231 is pulled from the housing 2.

In an exemplary operation, as tray 231, which may be stored in the housing 2 as shown in FIG. 10A, is pulled in direction Z, the arms 811, 812, 813, 814, flange 815, and retainers 810, 820 are transitioned from the first position, through a range of intermediate positions (FIGS. 10B-D), and toward the second position (FIG. 10E). As such, movement of tray 231 in direction Z may effect simultaneous clockwise rotation of fourth arm 814 about its first end 814a and counterclockwise rotation of third arm 813 about its second end 813b, which may cause the second arm 812 to act upon the first arm 811, which in turn may effect the clockwise rotation of the first arm 711 about its first end 811a. Second arm 812 may rotate clockwise, counterclockwise, or not at all, depending on the size and orientation of second arm 812 in relation to the first and third arms 811, 813. The clockwise rotation of fourth arm 814 transitions the second retainer 820 toward the second position (FIG. 10E).

The transition of the first and second arms 811, 812 toward the second position may also effect the transition of the first retainer 810 through a range of intermediate positions (FIGS. 10B-D). As the first arm 811 rotates clockwise about the second arm 812, the tension of the cables extending within the first retainer 810 against the first guide 810b may cause the appendage 810a to retract until the appendage 810a contacts the stopper 810d, at which point the first retainer 810 is at the second position. The motion of the appendage 810a to obtain the second position may also decrease the overlap between the first and second guides 810b, 810c, thereby allowing less restricted access to the cables when the tray 231 is pulled from the housing 2.

When the tray 231 is pushed into the housing 2, such as from the second position (FIG. 10E), the arms 811, 812, 813, 814, flange 815, and retainers 810, 820 are transitioned through a range of intermediate positions and toward the first position (FIG. 10A). As such, movement of tray 231 in a direction opposite Z may effect simultaneous counterclockwise rotation of fourth arm 814 about its first end 814a and the clockwise rotation of third arm 813 about its second end 813b, which may cause the second arm 812 to act upon the first arm 811, which in turn may effect the counterclockwise rotation of the first arm 811 about its first end 811a. Second arm 812 may rotate clockwise, counterclockwise, or not at all, depending on the size and orientation of second arm 812 in relation to the first and third arms 811, 813. The counterclockwise rotation of fourth arm 814 may transition the second retainer 820 toward the first position.

The transition of the system 800 to obtain the first position may effect the transition of the first retainer 810 through a range of intermediate positions and to the first position. As the position of the first retainer 810 is transitioned so the retainer 810 moves toward the distal end of the housing 2, the appendage 810a may contact the fillet 816 and pivot away from the stopper 810d, thereby decreasing the overlap between the first and second guides 810b, 810c and guiding the cables to an orientation substantially aligned with the first and second arms 811, 812.

The system 800 may be configured to be affixed to the tray 231 and may be affixed only to a distal portion of the housing 2, thereby allowing the patch panel device used therewith to have a decreased depth in the distal area behind the ports, while providing for compact storage of cables within the housing 2 and convenient access to the cables when the tray is pulled from the housing 2.

In any of the embodiments described herein, it is to be understood that any suitable connector may be used. For example, an LC type connector may be used. However, an LC connector is only one example of a small form connector that may be used. Differently sized connectors, whether larger or smaller may be used. As discussed above, connectors may be configured to be coupled to one or more cables, e.g., simplex or duplex. Specific connectors shown and described herein are merely illustrative embodiments. Connectors that are differently configured and/or sized may be utilized without deviating from the scope and spirit of the present invention.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended paragraphs.

The invention claimed is:

1. A communication patch panel system, comprising:
    a tray having a front end, a rear end, two sides ends, a plurality of ports connectable to cables, the two side ends of the tray being slidably engaged with a housing so that the tray has a first position substantially inside the housing and a second position substantially outside the housing;
    a first arm having a first end and a second end, the first end pivotably coupled to the housing;
    a second arm having a first end and a second end, the second end extending from and pivotably coupled to the second end of the first arm;
    a third arm having a first end extending from and pivotably coupled to the first end of the second arm, and a second end pivotably coupled to the tray; and
    a first cable retainer coupled to the first end of the second arm, the first cable retainer being moveable from a first position in which the first cable retainer is positioned above a plane in which the tray moves and at a first location between the two side ends of the tray to a second position in which the first cable retainer is positioned above the plane in which the tray moves and at a second location other than between the two side ends of the tray,
    wherein the first cable retainer is coupled to and extends from the first end of the third arm.

2. The system of claim 1, further comprising a fourth arm having a first end pivotably attached to the first arm, and a second end coupled to the tray.

3. The system of claim 2, further comprising a second cable retainer coupled to the second end of the fourth arm.

4. The system of claim 3, wherein the second cable retainer is rotatably coupled to the tray.

5. The system of claim 4, wherein the second cable retainer is adapted to rotate about a center of the second cable retainer.

6. The system of claim 3, wherein the second cable retainer is elliptical.

7. The system of claim 3, wherein a center of the second cable retainer is fixed in position in relation to the front end, rear end, and two side ends of the tray.

8. The system of claim 2, wherein the fourth arm is coupled to the first arm at a position between the first end and the second end of the first arm.

9. The system of claim 1, further comprising a flange having a first end fixedly coupled to the tray.

10. The system of claim 9, wherein the flange includes a second end positioned in a location other than between the two side ends of the tray.

11. The system of claim 10, wherein the second end of the third arm is pivotably coupled to the second end of the flange.

12. The system of claim 9, wherein the first end of the flange is coupled to an underside of the tray.

13. The system of claim 1, wherein the first end of the first arm overlies the housing.

* * * * *